(12) United States Patent
Takata

(10) Patent No.: US 10,158,283 B2
(45) Date of Patent: Dec. 18, 2018

(54) PFC SIGNAL GENERATION CIRCUIT, PFC CONTROL SYSTEM USING THE SAME, AND PFC CONTROL METHOD

(71) Applicant: Renesas Electronics Corporation, Tokyo (JP)

(72) Inventor: Yasuhiro Takata, Yokohama (JP)

(73) Assignee: Renesas Electronics Corporation, Koutou-ku, Tokyo (JP)

( * ) Notice: Subject to any disclaimer, the term of this patent is extended or adjusted under 35 U.S.C. 154(b) by 0 days.

(21) Appl. No.: 15/612,468

(22) Filed: Jun. 2, 2017

(65) Prior Publication Data

US 2017/0271978 A1    Sep. 21, 2017

Related U.S. Application Data

(63) Continuation of application No. 14/113,767, filed as application No. PCT/JP2012/002416 on Apr. 6, 2012, now Pat. No. 9,698,670.

(30) Foreign Application Priority Data

Apr. 26, 2011   (JP) .................................. 2011-098790

(51) Int. Cl.
    *H02M 1/42*     (2007.01)
    *H02M 3/158*    (2006.01)
    (Continued)

(52) U.S. Cl.
    CPC ....... *H02M 1/4208* (2013.01); *H02M 1/4225* (2013.01); *H02M 1/42* (2013.01);
    (Continued)

(58) Field of Classification Search
    CPC .. H02M 1/4225; H02M 3/157; H02M 3/1584; H02M 2003/1586; H02M 2001/0012
    See application file for complete search history.

(56) References Cited

U.S. PATENT DOCUMENTS

| 5,801,935 A | 9/1998 | Sugden et al. |
|---|---|---|
| 2010/0040877 A1 | 2/2010 | Yoshida et al. |

(Continued)

FOREIGN PATENT DOCUMENTS

| CN | 101080864 A | 11/2007 |
|---|---|---|
| CN | 101728953 A | 6/2010 |

(Continued)

OTHER PUBLICATIONS

Communication dated Jun. 12, 2015 from the State Intellectual Property Office of the P.R.C. in counterpart application No. 201280020387.6.

(Continued)

*Primary Examiner* — Fred E Finch, III
*Assistant Examiner* — Rafael O De Leon Domenech
(74) *Attorney, Agent, or Firm* — Sughrue Mion, PLLC

(57) ABSTRACT

A PFC signal generation circuit which generates a PFC signal to control a PFC circuit including a first inductor L1 connected to a first switch NM1 and a second inductor L2 connected to a second switch NM2 includes: a counter 101 whose count value is cleared based on a first timing when a zero current of the first inductor L1 is detected; a counter clear control circuit 202 that clears the count value after waiting until a cycle lower limit is reached, when the first timing is below the cycle lower limit; a first control signal output unit 109 that outputs a first PFC signal to turn on the first switch NM1 at a timing when the count value is cleared; and a second control signal output unit 117 that outputs a second PFC signal to turn on the second switch NM2 based on a second timing when a zero current of the second inductor L2 is detected. This leads to an improvement in power factor correction by the PFC circuit.

8 Claims, 16 Drawing Sheets

(51) Int. Cl.
*H02M 1/00* (2006.01)
*H05B 33/08* (2006.01)

(52) U.S. Cl.
CPC .... *H02M 3/1584* (2013.01); *H02M 2001/007* (2013.01); *H02M 2003/1586* (2013.01); *H05B 33/0815* (2013.01); *Y02B 70/126* (2013.01)

(56) References Cited

U.S. PATENT DOCUMENTS

| | | |
|---|---|---|
| 2010/0097041 A1 | 4/2010 | Ayukawa et al. |
| 2010/0097828 A1 | 4/2010 | Chen |
| 2010/0226149 A1 | 9/2010 | Masumoto |
| 2011/0221402 A1 | 9/2011 | Park et al. |
| 2014/0042992 A1 | 2/2014 | Takata |

FOREIGN PATENT DOCUMENTS

| | | |
|---|---|---|
| EP | 1826896 A1 | 8/2007 |
| JP | 1-293449 A | 11/1989 |
| JP | 2007-195282 A | 8/2007 |
| JP | 2010-119285 A | 5/2010 |
| JP | 2010-200437 A | 9/2010 |
| JP | 2010-233439 A | 10/2010 |
| WO | 2008/032769 A1 | 3/2008 |

OTHER PUBLICATIONS

International Search Report of PCT/JP2012/002416, dated Jun. 26, 2012.

US 10,158,283 B2

PFC SIGNAL GENERATION CIRCUIT, PFC CONTROL SYSTEM USING THE SAME, AND PFC CONTROL METHOD

CROSS REFERENCE TO RELATED APPLICATIONS

This application is a continuation of U.S. application Ser. No. 14/113,767 filed Oct. 24, 2013, which is a National Stage of International Application No. PCT/JP2012/002416 filed Apr. 6, 2012, and claims priority from Japanese Patent Application No. 2011-098790, filed Apr. 26, 2011, the disclosures of which are incorporated by reference herein in their entirety.

TECHNICAL FIELD

The present invention relates to a PFC signal generation circuit, a PFC control system using the same, and a PFC control method.

BACKGROUND ART

With the recent demand for miniaturization, low power consumption, and the like of electronic devices, power supplies incorporating a switching circuit that repeats turning on and off periodically, which are so-called switching power supplies, have been more frequently used. The use of PWM (Pulse Width Modulation) control for adjusting a duty ratio of an input pulse signal, for example, in each switching power supply enables adjustment of an output voltage according to an operating state of an electronic device.

In addition, there is an increasing demand for a further reduction in power consumption by improving the conversion efficiency. In the International Energy Star Program (Energy Star), for example, a power factor correction (PFC) is necessary for electronic devices of 75 W or higher. The PFC control includes a single mode and an interleave mode. In the interleave mode, switching operations are complementarily performed by two PFC control pulse signals having a phase difference π (180°). As a result, two coil currents having a phase difference π are generated. Accordingly, in the interleave mode, electric power twice as large as that in the single mode is obtained. Further, the ripple of an output current is small, which leads to a reduction in the capacity of a capacitor for reducing the ripple.

Patent Literature 1 discloses a switching power supply which employs a critical mode interleaved PFC control. Patent Literature 1 discloses a technique for detecting only a zero current in one coil current and automatically generating PFC control pulse signals having a phase difference π, and a technique for detecting a zero current in each of two coil currents and generating two PFC control pulse signals. In the latter case, the critical mode for both coil currents can be ensured, which results in improvement in efficiency.

Note that Patent Literature 2 discloses a watchdog timer which detects an input of a clear signal within a certain period of time to be counted, in accordance with execution of a program, and outputs a reset signal to a computer to inform an abnormality. This watchdog timer includes signal control means that allows the clear signal to be input only before a set time with respect to an end time of the certain period of time.

CITATION LIST

Patent Literature

[Patent Literature 1] United States Patent Application Publication No. 2010/0097828 [Patent Literature 2] Japanese Unexamined Patent Application Publication No. 01-293449

SUMMARY OF INVENTION

Technical Problem

The present inventor has found the following problems. In the case of detecting a zero current in coil currents in Patent Literature 1, there is a possibility that the cycle of each PFC control pulse signal becomes extremely small due to noise or the like. There is also a possibility that such abnormal PFC control pulse signals cause an increase in power loss and a reduction in power factor.

Solution to Problem

A PFC signal generation circuit according to the present invention is a PFC signal generation circuit that generates a PFC signal to control a PFC circuit including a first inductor connected to a first switch and a second inductor connected to a second switch. The PFC signal generation circuit includes: a counter whose count value is based on a first timing at which a zero current of the first inductor is detected; a counter clear control circuit that clears the count value after waiting until a cycle lower limit is reached, when the first timing is below the cycle lower limit; a first control signal output unit that outputs a first PFC signal to turn on the first switch at a timing when the count value is cleared; and a second control signal output unit that outputs a second PFC signal to turn on the second switch, based on a second timing at which a zero current of the second inductor is detected.

A PFC control system according to the present invention is a PFC control system including: a PFC circuit connected to an AC power supply; and a PFC signal generation circuit that generates a PFC signal to control the PFC circuit. The PFC circuit includes: a first inductor connected to a first switch; and a second inductor connected to a second switch. The PFC signal generation circuit includes: a counter whose count value is cleared based on a first timing at which a zero current of the first inductor is detected; a counter clear control circuit that clears the count value after waiting until a cycle lower limit is reached, when the first timing is below the cycle lower limit; a first control signal output unit that outputs a first PFC signal to turn on the first switch at a timing when the count value is cleared; and a second control signal output unit that outputs a second PFC signal to turn on the second switch, based on a second timing at which a zero current of the second inductor is detected.

A PFC control method according to the present invention is a PFC control method that controls a PFC circuit including a first inductor connected to a first switch and a second inductor connected to a second switch. The PFC control method includes: clearing a count value of a counter based on a first timing at which a zero current of the first inductor is detected; turning on the first switch at a timing when the count value is cleared; and turning on the second switch based on a second timing at which a zero current of the second inductor is detected. In the clearing of the count value of the counter, when the first timing is below a cycle lower limit, the count value is cleared after waiting until the cycle lower limit is reached.

According to the present invention, in the case of clearing the count value of the counter, when the timing at which the zero current of the first inductor is detected is below the cycle lower limit, the count value is cleared after waiting until the cycle lower limit is reached. This ensures the cycle lower limit of the first PFC signal which acts as a reference. Consequently, the power factor correction by the PFC circuit can be further improved.

Advantageous Effects of Invention

According to the present invention, it is possible to generate a PFC control pulse signal to further improve the power factor correction by a PFC circuit.

DESCRIPTION OF EMBODIMENTS

Hereinafter, specific embodiments of the present invention will be described in detail with reference to the drawings. However, the present invention is not limited to the following embodiments. For clarity of explanation, the following description and the drawings are simplified as needed.

First Embodiment

First, the outline of a processor system to which a PFC signal generation unit according to this embodiment is applied will be described. The PFC signal generation unit according to this embodiment is applied to the processor system described below. However, the processor system described below is illustrated by way of example, and the present invention is also applicable to other processor systems.

Figure 1:
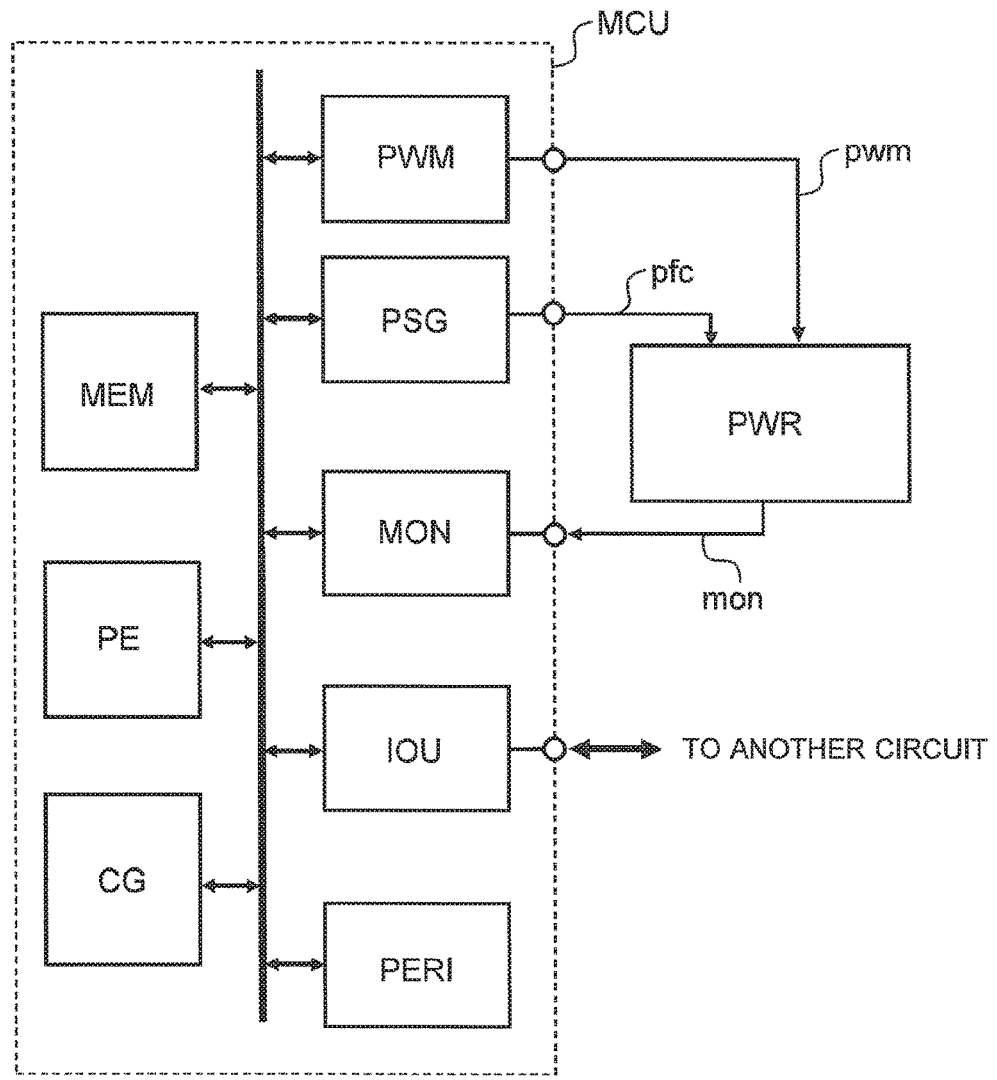
FIG. 1 is a schematic diagram of a processor system MCU to which a PWM signal generation unit according to an embodiment is applied.

FIG. 1 is a schematic diagram of a processor system MCU to which a PWM signal generation unit according to this embodiment is applied. As shown in FIG. 1, this processor system MCU includes a memory MEM, an operation core PE, a clock generation unit CG, a PWM signal generation unit PWM, a PFC signal generation unit PSG, a monitor unit MON, an IO unit IOU, and a peripheral circuit PERI.

FIG. 1 also shows a control target circuit PWR which is controlled by the processor system MCU. This control target circuit PWR is a power supply circuit, for example. This power supply circuit generates a DC power supply voltage with high efficiency from an AC power supply voltage based on a PFC control pulse signal pfc generated by the PFC signal generation unit PSG (AC/DC conversion). Further, based on a PWM control pulse signal pwm generated by the PWM signal generation unit PWM, a DC power supply voltage is generated by boosting or stepping down the DC power supply voltage (DC/DC conversion), and is supplied to another circuit.

The memory MEM stores programs used by the processor system MCU, and set values used to cause the processor system MCU to operate, for example.

The operation core PE performs specific processes required for the processor system MCU, based on a program stored in the memory MEM, or an externally loaded program. The operation core is generally a CPU (Central Processing Unit).

The clock generation unit CG generates clock signals for use in each circuit block within the processor system MCU. The clock signals generated by the clock generation unit CG may be output to the outside.

Note that the clock signals for use in the processor system MCU can also be supplied from an external circuit.

The PWM signal generation unit PWM generates the PWM control pulse signal pwm which is a pulse signal for PWM control of the control target circuit PWR. This PWM signal generation unit PWM can be achieved by using a timer function of the processor system MCU, for example.

The PFC signal generation unit PSG generates the PFC control pulse signal pfc which is a pulse signal for use in PFC control for the control target circuit PWR. As with the PWM signal generation unit PWM, the PFC signal generation unit PSG can be achieved by using the timer function of the processor system MCU, for example.

The monitor unit MON monitors a feedback signal mon which is sent from the control target circuit PWR to generate the PWM control pulse signal pwm and the PFC control pulse signal pfc. The monitor unit MON converts the feedback signal mon, which is an analog signal, into a digital signal, and transmits the digital signal to the operation core PE, for example. In the example of FIG. 1, the feedback signal mon output from the control target circuit PWM, which is externally provided, is monitored, and the digital value corresponding to the feedback signal mon is loaded into the processor system MCU. This monitor unit MON can be composed of a circuit capable of converting an analog value into a digital value, such as an analog-to-digital converter (ADC) or a comparator circuit.

The IO unit IOU communicates with an externally-provided circuit, and receives a control signal or the like for the processor system MCU, or transmits processing results of the processor system MCU, for example. Specific examples of the IO unit IOU may include an SPI unit and a UART unit. Note that the SPI unit performs communication based on SPI (System Packet Interface) specifications, which is 3-wire or 4-wire serial communication. The UART (Universal Asynchronous Receiver Transmitter) unit converts serial signals of an asynchronous communication system into parallel signals, and also performs the conversion in the opposite direction.

The peripheral circuit PERI is a circuit other than the circuit blocks described above, and includes a circuit block used by the operation core PE. Examples of the peripheral circuit PERI may include a timer unit, a watchdog timer unit, a DMA (Direct Memory Access) unit, a low-voltage detection unit, and a power-on reset (POR) unit.

The processor system MCU to which the present invention is applied has a configuration in which the operation core PE, the memory MEM, the PWM signal generation unit PWM, the PFC signal generation unit PSG, the monitor unit MON, the IO unit IOU, and the peripheral circuit PERI are interconnected via a bus. Although not shown, the processor system MCU is supplied with power from another circuit.

The processor system MCU described above is an example of the processor system to which the present invention is applied, and the programs and data stored in the memory MEM can be modified as needed depending on the specifications of the system, for example. For example, the circuit blocks may be connected via a plurality of buses, or the operation core PE may be directly connected to the other circuit blocks without involving a bus.

The processor system MCU generates the PWM control pulse signal pwm and the PFC control pulse signal pfc, and supplies them to the control target circuit PWR. The processor system MCU controls the duty of the PWM control pulse signal pwm and the PFC control pulse signal pfc, the generation timing of the PWM control pulse signal pwm, and the like based on the feedback signal mon from the control target circuit PWR, the control signal received from another circuit, and the like.

To specify the utilization form of each of the PWM control pulse signal pwm and the PFC control pulse signal pfc, which are generated by the processor system MCU, a power supply circuit will be described as an example of the control target circuit PWR. The power supply circuit described below drives an LED (Light Emitting Diode) as a load circuit. However, the load circuit is not limited to an LED, but may also be a general circuit.

Figure 2A:
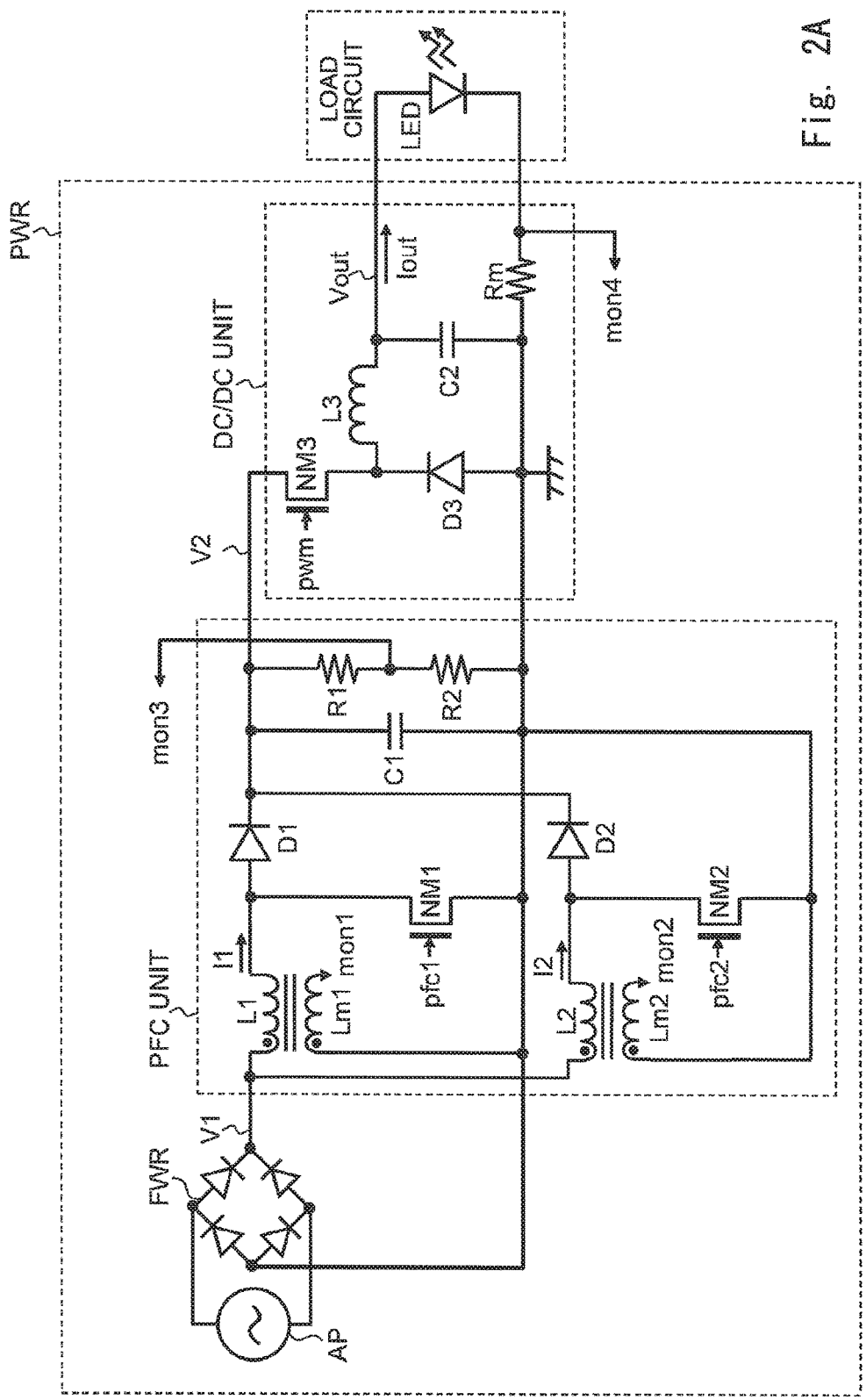
FIG. 2A is a circuit diagram of a power supply circuit that drives an LED.
Figure 2B:
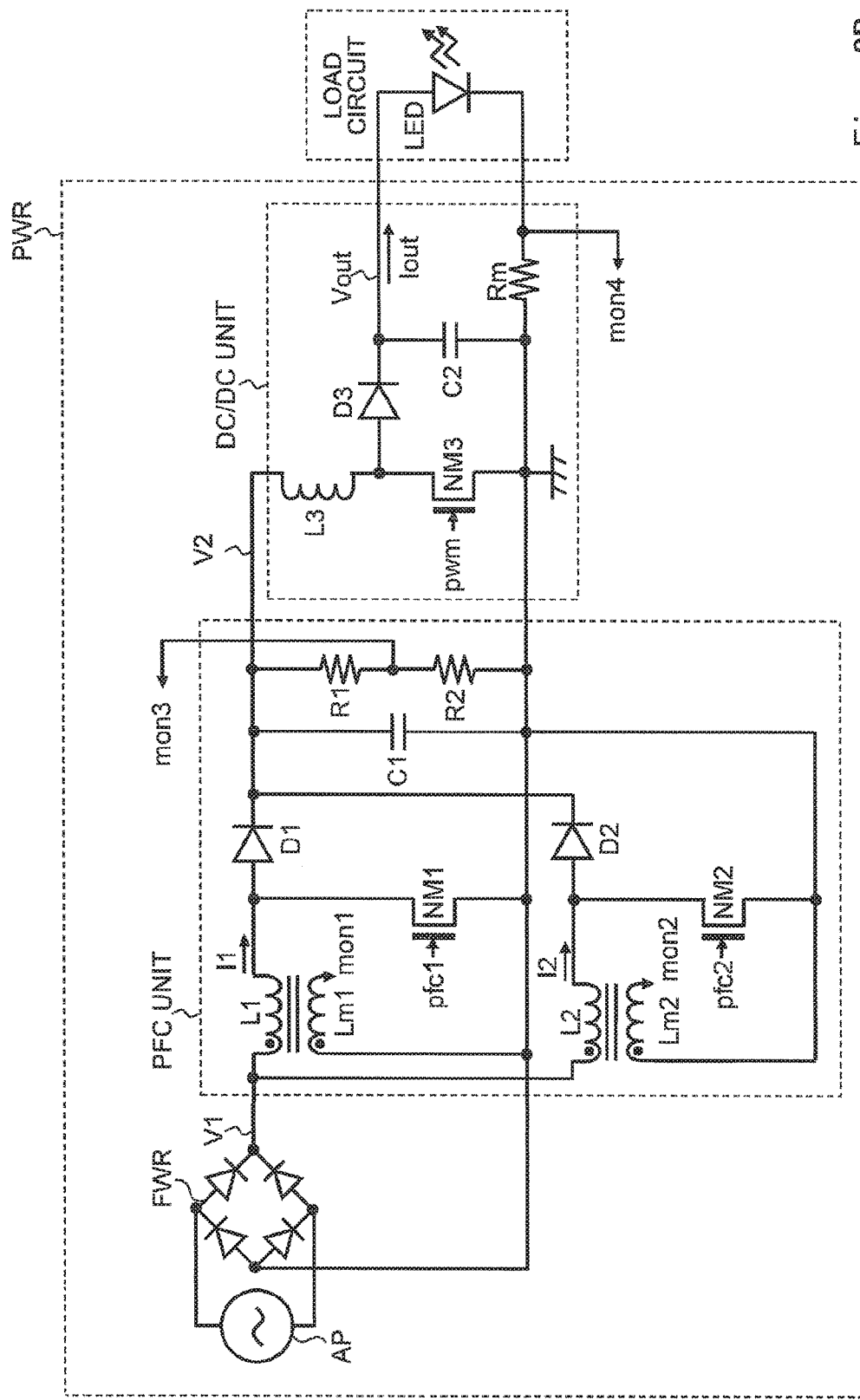
FIG. 2B is a circuit diagram of the power supply circuit that drives the LED.

FIGS. 2A and 2B each show an example of the power supply circuit that drives an LED. In FIGS. 2A and 2B, the power supply circuit is denoted by PWR. In the power supply circuit PWR shown in FIGS. 2A and 2B, an NMOS transistor is used as an output transistor that performs a switching operation. This output transistor may be composed of a PMOS transistor, a PNP transistor, or an NPN transistor.

Each of the power supply circuits PWR shown in FIGS. 2A and 2B includes an AC power supply AP, a full-wave rectification circuit FWR, a PFC unit, and a DC/DC unit. In FIGS. 2A and 2B, the AC power supply AP, the full-wave rectification circuit FWR, and the PFC unit are common.

First, the full-wave rectification circuit FWR generates a DC voltage V1 from the AC power supply AP. The full-wave rectification circuit FWR is a bridge circuit including four diodes. In the full-wave rectification circuit FWR, the cathodes of two diodes each having an anode connected to the AC power supply AP are commonly connected to an output of the full-wave rectification circuit FWR. On the other hand, the anodes of two diodes each having a cathode connected to the AC power supply AP are commonly grounded.

Next, the PFC unit will be described. The PFC unit shown in FIG. 2A is a non-isolated boost converter. This PFC unit includes inductors L1, L2, Lm1, and Lm2, diodes D1 and D2, NMOS transistors NM1 and NM2, a smoothing capacitor C1, and resistors R1 and R2. The PFC unit is a PFC circuit of an interleave mode, and causes the NMOS transistors NM1 and NM2 to complementarily perform switching operations according to two PFC control pulse signals pfc1 and pfc2 having a phase difference of about n) (180°. The PFC unit generates a DC voltage V2 from the DC voltage V1.

One end of each of the inductors L1 and L2 is commonly connected to the output of the full-wave rectification circuit FWR, and receives the voltage V1. The other end of the inductor L1 is connected to the anode of the diode D1. The other end of the inductor L2 is connected to the anode of the diode D2. The cathodes of the diodes D1 and D2 are commonly connected to one end of the smoothing capacitor C1. That is, the inductor L1 and the diode D1 which are connected in series are connected in parallel with the inductor L2 and the diode D2 which are connected in series. The other end of the smoothing capacitor C1 is grounded.

A node between the inductor L1 and the diode D1, which are connected in series, is connected to the drain of the NMOS transistor NM1. The source of the NMOS transistor NM1 is grounded. The gate of the NMOS transistor NM1 receives the PFC control pulse signal pfc1. The NMOS transistor NM1 performs a switching operation according to the voltage level of the PFC control pulse signal pfc1. Energy is accumulated in the inductor L1 during a period in which the NMOS transistor NM1 turns on. The smoothing capacitor C1 is charged with energy, which is accumulated in the inductor L1 during a period in which the NMOS transistor NM1 turns off, through the diode D1.

A node between the inductor L2 and the diode D2, which are connected in series, is connected to the drain of the NMOS transistor NM2. The source of the NMOS transistor NM2 is grounded. The gate of the NMOS transistor NM2 receives the PFC control pulse signal pfc2. The NMOS transistor NM2 performs a switching operation according to the voltage level of the PFC control pulse signal pfc2. During a period in which the NMOS transistor NM2 turns on, energy is accumulated in the inductor L2. During a period in which the NMOS transistor NM2 turns off, the smoothing capacitor C1 is charged with the energy accumulated in the inductor L2 through the diode D2. The output voltage V2 corresponding to the electric charge charged in the smoothing capacitor C1 is output.

Here, a feedback signal mon1 corresponding to a current I1 flowing through the inductor L1 is generated by the monitor inductor Lm1 which is electromagnetically coupled with the inductor L1 through a core. Then, the feedback signal mon1 is fed back to the monitor unit MON. Similarly, a feedback signal mon2 corresponding to a current I2 flowing through the inductor L2 is generated by the monitor inductor Lm2 which is electromagnetically coupled with the inductor L2 through a core. Then, the feedback signal mon2 is fed back to the monitor unit MON. With this configuration, a zero current of each of the currents I1 and I2 is detected.

In parallel with the smoothing capacitor C1, the resistors R1 and R2 are connected in series. In other words, the output voltage V2 of the PFC unit is applied to the both ends of the resistors R1 and R2. A feedback signal mon3 is output from a node between the resistor R1 and the resistor R2. The feedback signal mon3 is a monitor voltage which is obtained by dividing the output voltage V2 according to a resistance ratio of the resistors R1 and R2. This feedback signal mon3 is fed back to the monitor unit MON of the processor system MCU. Thus, the duty ratio and pulse width of the PFC control pulse signals pfc1 and pfc2 are determined. In this manner, each of the PFC units shown in FIGS. 2A and 2B serves as a constant voltage control circuit.

Next, the DC/DC units shown in FIGS. 2A and 2B will be described in order. First, the DC/DC unit shown in FIG. 2A will be described. The DC/DC unit shown in FIG. 2A is a step-down DC/DC converter. This DC/DC unit includes an NMOS transistor NM3, an inductor L3, a diode D3, a smoothing capacitor C2, and a resistor Rm.

The drain of the NMOS transistor NM3 is connected to an output of the PFC unit, and the source of the NMOS transistor NM3 is connected to the cathode of the diode D3. The gate of the NMOS transistor NM3 receives the PWM control pulse signal pwm. Accordingly, the NMOS transistor NM3 performs a switching operation according to the voltage level of the PWM control pulse signal pwm. The anode of the diode D3 is grounded. A node between the source of the NMOS transistor NM3 and the cathode of the diode D3 is connected to one end of the inductor L3. The other end of the inductor L3 is connected to one end of the smoothing capacitor C2. The other end of the smoothing capacitor C2 is grounded.

An output voltage Vout corresponding to the electric charge accumulated in the smoothing capacitor C2 is output from a node between the smoothing capacitor C2 and the inductor L3. The electric charge accumulated in the smoothing capacitor C2 is supplied to the LED as an output current Iout. The resistor Rm is provided between the cathode of the LED and the ground. The output current Iout flowing through the LED flows through the resistor Rm. That is, a voltage corresponding to the output current Iout and the resistance value of the resistor Rm is generated at the both ends of the resistor Rm. This voltage is a monitor voltage for monitoring the output current Iout. This monitor voltage is fed back to the monitor unit MON as a feedback signal mon4. The PWM signal generation unit of the processor system MCU generates the PWM control pulse signal pwm having a duty ratio or a cycle at which the voltage level of the monitor voltage is constant. In this manner, the DC/DC unit shown in FIG. 2A serves as a constant current control circuit.

Next, the DC/DC unit shown in FIG. 2B will be described. The DC/DC unit shown in FIG. 2B is a non-isolated boost DC/DC converter. This DC/DC unit also includes the NMOS transistor NM3, the inductor L3, the diode D3, the smoothing capacitor C2, and the resistor Rm.

One end of the inductor L3 is connected to an output of the PFC unit, and the other end of the inductor L3 is connected to the drain of the NMOS transistor NM3. The source of the NMOS transistor NM3 is grounded. The gate of the NMOS transistor NM3 receives the PWM control pulse signal pwm. Accordingly, the NMOS transistor NM3 performs a switching operation according to the voltage level of the PWM control pulse signal pwm. A node between the drain of the NMOS transistor NM3 and the inductor L3 is connected to the anode of the diode D3. The cathode of the diode D3 is connected to one end of the smoothing capacitor C2. The other end of the smoothing capacitor C2 is grounded.

The output voltage Vout corresponding to the electric charge accumulated in the smoothing capacitor C2 is output from a node between the smoothing capacitor C2 and the cathode of the diode D3. The electric charge accumulated in the smoothing capacitor C2 is supplied to the LED as the output current Iout. The resistor Rm is provided between the cathode of the LED and the ground. The output current Iout flowing through the LED flows through the resistor Rm. That is, a voltage corresponding to the output current Iout and the resistance value of the resistor Rm is generated at the both ends of the resistor Rm. This voltage is a monitor voltage for monitoring the output current Iout. This monitor voltage is fed back to the monitor unit MON as the feedback signal mon4. The PWM signal generation unit of the processor system MCU generates the PWM control pulse signal pwm having a duty ratio or a cycle at which the voltage level of the monitor voltage is constant. In this manner, the DC/DC unit shown in FIG. 2B also serves as a constant current control circuit.

Figure 3A:
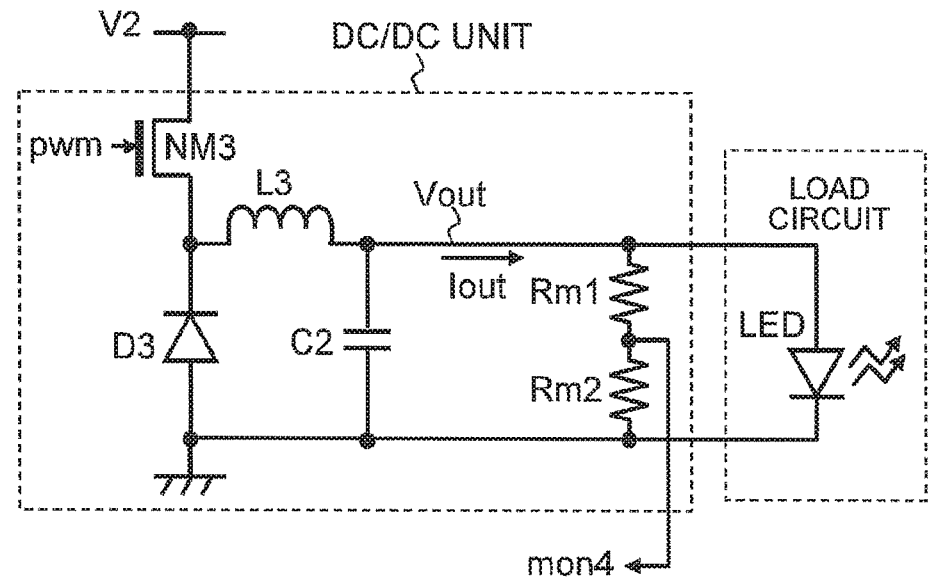
FIG. 3A is a circuit diagram showing another configuration example of a DC/DC unit.
Figure 3B:
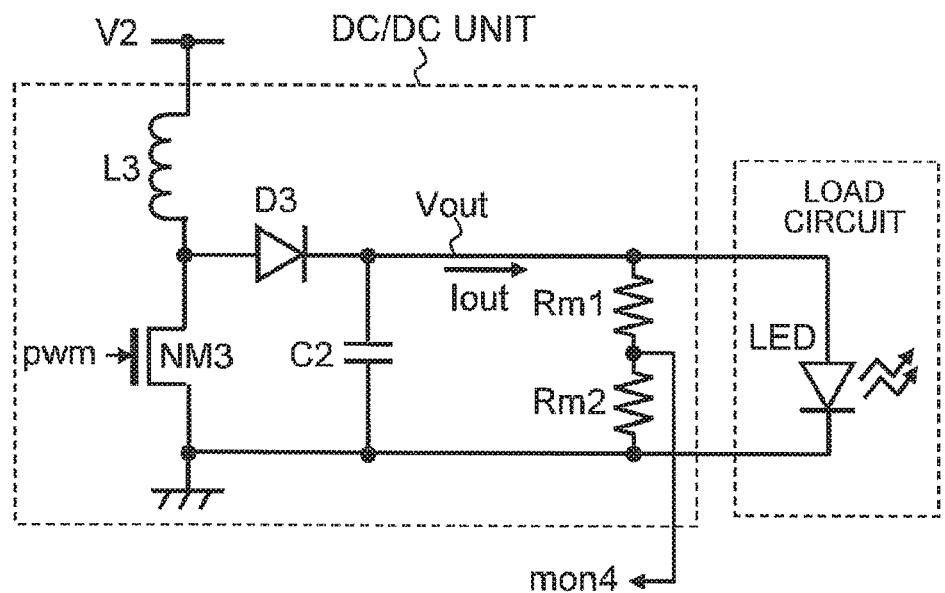
FIG. 3B is a circuit diagram showing another configuration example of the DC/DC unit.

Referring next to FIGS. 3A and 3B, other configurations of the DC/DC unit will be described. As with the DC/DC unit shown in FIG. 2A, the DC/DC unit shown in FIG. 3A is a non-isolated step-down DC/DC converter. In the DC/DC unit shown in FIG. 2A, the resistor Rm for generating the feedback signal mon4 is connected in series with the LED. On the other hand, in the DC/DC unit shown in FIG. 3A, resistors Rm1 and Rm2 for generating the feedback signal mon4 are connected in parallel with the LED.

Accordingly, the output voltage Vout of the power supply circuit PWR is applied to the both ends of the resistors Rm1 and Rm2. The feedback signal mon4 is output from a node between the resistor Rm1 and the resistor Rm2. The feedback signal mon4 is a monitor voltage which is obtained by dividing the output voltage Vout according to a resistance ratio of the resistors Rm1 and Rm2. This feedback signal mon4 is fed back to the monitor unit MON of the processor system MCU. The PWM signal generation unit of the processor system MCU generates the PWM control pulse signal pwm having a duty ratio or a cycle at which the voltage level of the monitor voltage is constant. In this manner, the DC/DC unit shown in FIG. 3A serves as a constant voltage control circuit. The other components are similar to those of the DC/DC unit shown in FIG. 2A, so the description thereof is omitted.

As with the DC/DC unit shown in FIG. 2B, the DC/DC unit shown in FIG. 3B is a non-isolated boost DC/DC converter. In the DC/DC unit shown in FIG. 2B, the resistor Rm for generating the feedback signal mon4 is connected in series with the LED. On the other hand, in the DC/DC unit shown in FIG. 3B, the resistors Rm1 and Rm2 for generating the feedback signal mon4 are connected in parallel with the LED.

Accordingly, the output voltage Vout of the power supply circuit PWR is applied to the both ends of the resistors Rm1 and Rm2. The feedback signal mon4 is output from a node between the resistor Rm1 and the resistor Rm2. The feedback signal mon4 is a monitor voltage which is obtained by dividing the output voltage Vout according to a resistance ratio of the resistors Rm1 and Rm2. This feedback signal mon4 is fed back to the monitor unit MON of the processor system MCU. The PWM signal generation unit of the processor system MCU generates the PWM control pulse signal pwm having a duty ratio or a cycle at which the voltage level of the monitor voltage is constant. In this manner, the DC/DC unit shown in FIG. 3B serves as a constant voltage control circuit. The other components are similar to those of the DC/DC unit shown in FIG. 2B, so the description thereof is omitted.

Figure 4:
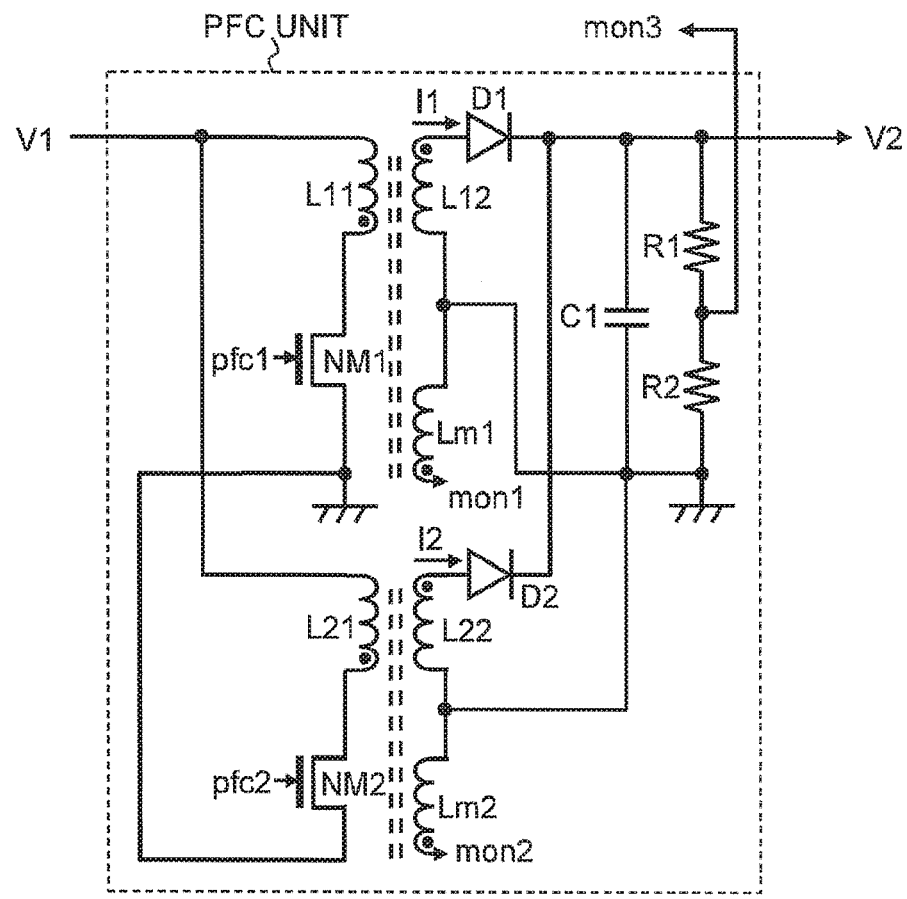
FIG. 4 is a circuit diagram showing another configuration example of a PFC unit.

Referring next to FIG. 4, another configuration of the PFC unit will be described. The PFC units shown in FIGS. 2A and 2B are non-isolated boost converters, whereas the PFC unit shown in FIG. 4 is an isolated flyback converter. The PFC units have different types, i.e., the non-isolated type and the isolated type, but have the same operating principle. The PFC unit shown in FIG. 4 includes inductors L11, L12, L21, L22, Lm1, and Lm2, the diodes D1 and D2, the NMOS transistors NM1 and NM2, and the smoothing capacitor C1.

One end of each of the inductors L11 and L21 is commonly connected to the output of the full-wave rectification circuit FWR, and is supplied with the voltage V1. The other end of the inductor L11 is connected to the drain of the NMOS transistor NM1. The other end of the inductor L2 is connected to the drain of the NMOS transistor NM2. The sources of the NMOS transistors NM1 and NM2 are grounded. The gate of the NMOS transistor NM1 receives the PFC control pulse signal pfc1, and the gate of the NMOS transistor NM2 receives the PFC control pulse signal pfc2.

The inductor L12 is electromagnetically coupled with the inductor L11 through a core. The anode of the diode D1 is connected to the other end of the inductor L12 having one end grounded. The inductor L22 is electromagnetically coupled with the inductor L21 through a core. The anode of the diode D2 is connected to the other end of the inductor L22 having one end grounded. The cathodes of the diodes D1 and D2 are commonly connected to one end of the smoothing capacitor C1. The other end of the smoothing capacitor C1 is grounded.

Here, the feedback signal mon1 corresponding to the current I1 flowing through the inductor L12 is generated by the monitor inductor Lm1 which is electromagnetically coupled with the inductor L11 through the core. This feedback signal mon1 is fed back to the monitor unit MON. Similarly, the feedback signal mon2 corresponding to the current I2 flowing through the inductor L2 is generated by the monitor inductor Lm2 which is electromagnetically coupled with the inductor L2 through the core. This feedback signal mon2 is fed back to the monitor unit MON. With this configuration, a zero current of each of the currents I1 and I2 is detected.

In parallel with the smoothing capacitor C1, the resistors R1 and R2 are connected in series. In other words, the output voltage V2 of the PFC unit is applied to the both ends of the resistors R1 and R2. The feedback signal mon3 is output from a node between the resistor R1 and the resistor R2. The feedback signal mon3 is a monitor voltage which is obtained by dividing the output voltage V2 according to a resistance ratio of the resistors R1 and R2. This feedback signal mon3 is fed back to the monitor unit MON of the processor system MCU. Thus, the duty ratio and pulse width of the PFC control pulse signals pfc1 and pfc2 are determined. In this manner, the PFC unit shown in FIG. 4 serves as a constant voltage control circuit.

Figure 5A:
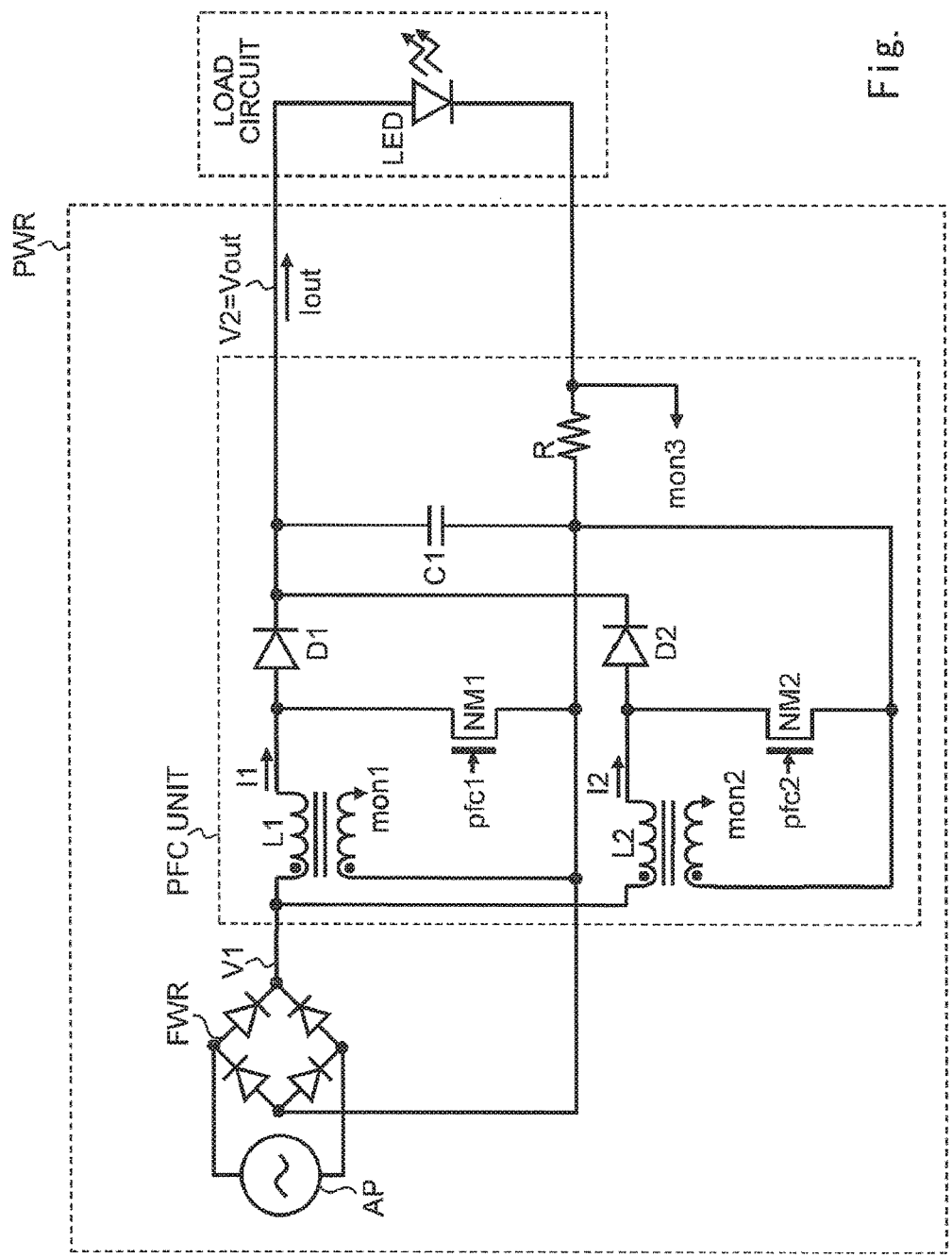
FIG. 5A is a circuit diagram showing another configuration example of the power supply circuit that drives the LED.
Figure 5B:
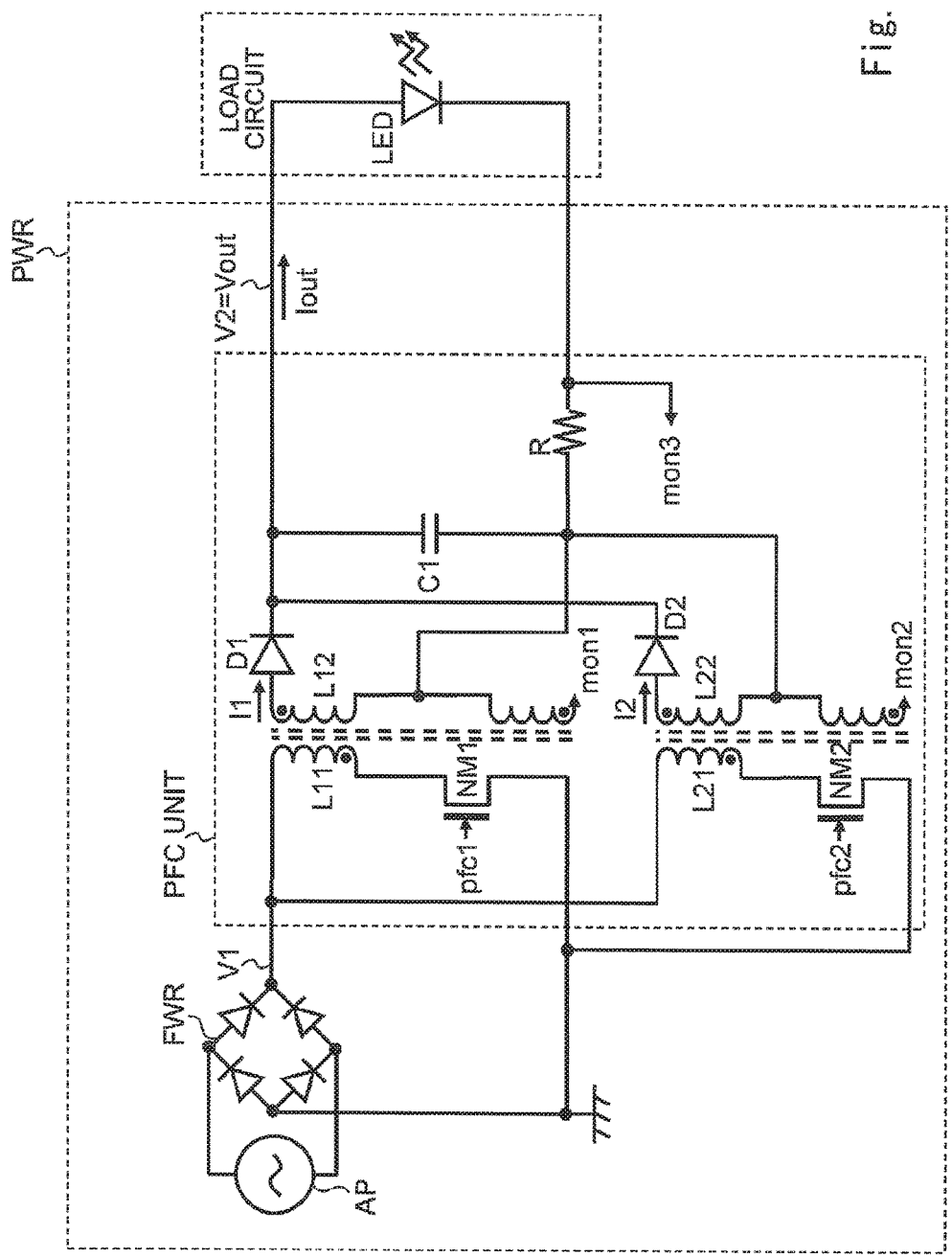
FIG. 5B is a circuit diagram showing another configuration example of the power supply circuit that drives the LED.

Referring next to FIGS. 5A and 5B, other configurations of the power supply circuit PWR will be described. As with the power supply circuits PWR shown in FIGS. 2A and 2B, in the power supply circuit PWR shown in FIG. 5A, the PFC unit is a non-isolated boost converter. In the PFC circuits shown in FIGS. 2A and 2B, the resistors R1 and R2 for generating the feedback signal mon3 are connected in parallel with the smoothing capacitor C1. On the other hand, in the PFC unit shown in FIG. 5A, a resistor R for generating the feedback signal mon3 is connected in series with the LED. That is, this PFC unit is a constant current control circuit. In this case, as shown in FIG. 5A, the DC/DC unit can be omitted and the LED can be directly connected to the PFC unit. This leads to the miniaturization of the circuit.

As with the power supply circuit PWR shown in FIG. 4, in the power supply circuit PWR shown in FIG. 5B, the PFC unit is an isolated flyback converter. In the PFC unit shown in FIG. 4, the resistors R1 and R2 for generating the feedback signal mon3 are connected in parallel with the smoothing capacitor C1. On the other hand, in the PFC unit shown in FIG. 5B, the resistor R for generating the feedback signal mon3 is connected in series with the LED. That is, this PFC unit is a constant current control circuit. In this case, as shown in FIG. 5B, the DC/DC unit can be omitted and the LED can be directly connected to the PFC unit. This leads to the miniaturization of the circuit.

Figure 6:
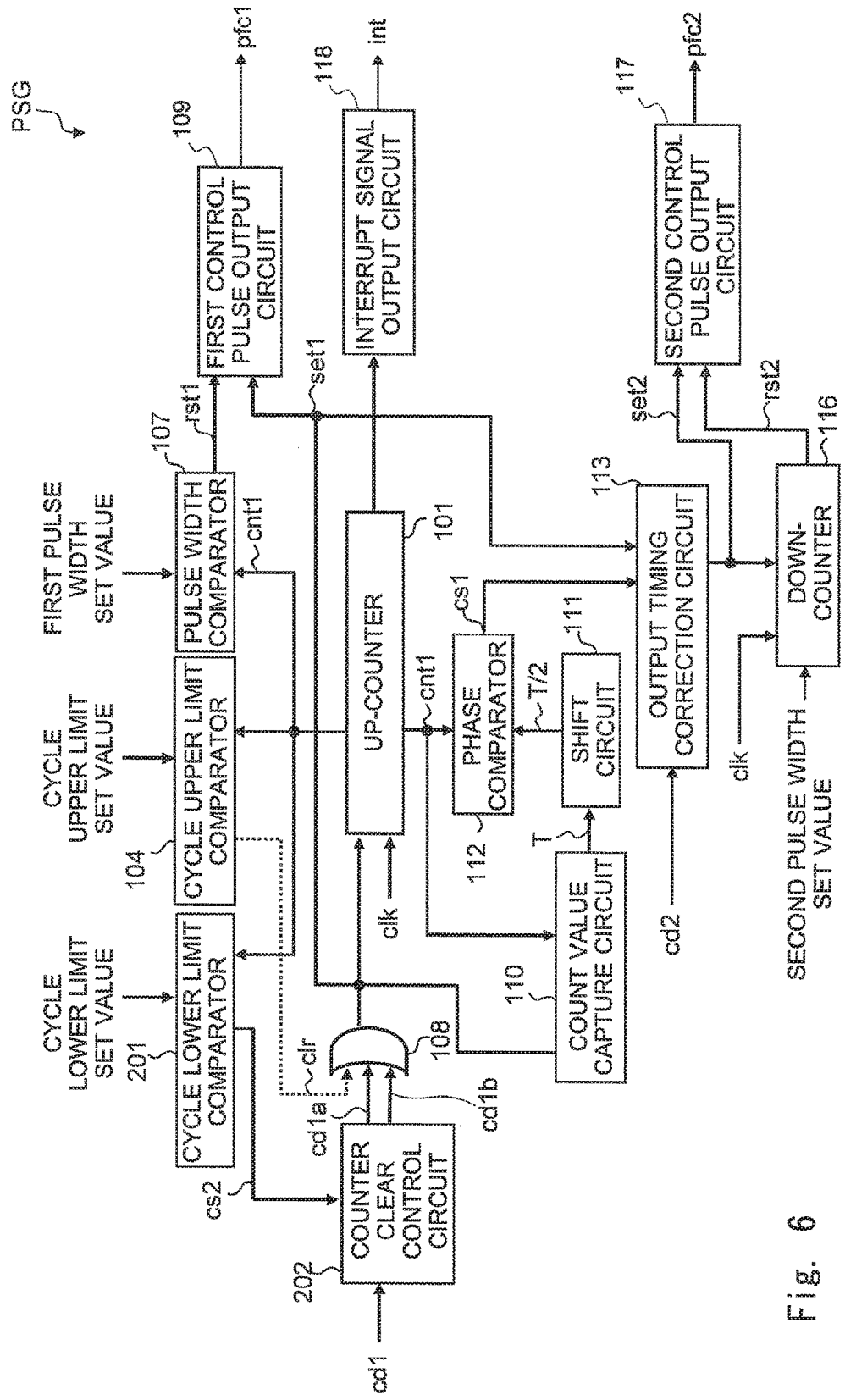
FIG. 6 is a block diagram of a PFC signal generation unit PSG according to a first embodiment.

Referring next to FIG. 6, the PFC signal generation unit PSG according to a first embodiment of the present invention will be described. FIG. 6 is a block diagram of the PFC signal generation unit PSG according to the first embodiment. As shown in FIG. 6, the PFC signal generation unit PSG includes an up-counter 101, a cycle upper limit comparator 104, a cycle lower limit comparator 201, a counter clear control circuit 202, a pulse width comparator 107, an OR gate 108, a first control pulse output circuit 109, a count value capture circuit 110, a shift circuit 111, a phase comparator 112, an output timing correction circuit 113, a down-counter 116, a second control pulse output circuit 117, and an interrupt signal output circuit 118.

The up-counter 101 counts up received clock signals clk. The up-counter 101 clears the count value at the timing when a zero current detection signal cd1 of the current I1 flowing through the inductor L1 is input, and newly starts counting from 0. The zero current detection signal cd1 is generated by the monitor unit MON shown in FIG. 1.

The cycle upper limit comparator 104 is a digital comparator, and is, more specifically, a coincidence circuit. The cycle upper limit comparator 104 outputs a clear signal clr when a count value cnt1 of the up-counter 101 matches the cycle upper limit set value. When the clear signal clr is input to the up-counter 101, the count value of the up-counter 101 is cleared. Specifically, when the zero current detection signal cd1 of the current I1 is not input before the count value of the up-counter 101 reaches the set cycle upper limit set value, the count value of the up-counter 101 is forcibly cleared. As described above, the clear signal clr is exceptionally output, and thus is indicated by a dashed line in FIG. 6.

Here, the cycle upper limit set value is an upper limit of a cycle which can be taken by the PFC control pulse signal pfc1, and is set by the operation core PE. As described in detail later, the cycle of the PFC control pulse signal pfc1 is basically an interval at which the zero current detection signal cd1 of the current I1 is input, and is not always constant. A cycle upper limit set value is a supplementary value which is used when the zero current detection signal cd1 of the current I1 is not input during start-up of the system or due to occurrence of some trouble, for example.

The cycle lower limit comparator 201 is a digital comparator, and is, more specifically, a coincidence circuit. When the count value cnt1 of the up-counter 101 matches the cycle lower limit set value, the cycle lower limit comparator 201 outputs a coincidence signal cs2. The coincidence signal cs2 is input to the counter clear control circuit 202.

The counter clear control circuit 202 determines the timing at which the zero current detection signal cd1 of the current I1 is input, based on the coincidence signal cs2 output from the cycle lower limit comparator 201, and outputs clear signals cd1a and cd1b at an appropriate timing. Specifically, when the zero current detection signal cd1 of the current I1 is input at a timing equal to or less than the cycle lower limit set value, the counter clear control circuit waits until the cycle lower limit set value is reached, and clears the count value of the up-counter 101. On the other hand, when the zero current detection signal cd1 of the current I1 is input at a timing beyond the cycle lower limit set value, the count value of the up-counter 101 is cleared at the timing, as usual. The configuration and operation of the counter clear control circuit 202 will be described in detail later.

The pulse width comparator 107 is a digital comparator, and is, more specifically, a coincidence circuit. When the count value cnt1 of the up-counter 101 matches the pulse width set value of the PFC control pulse signal pfc1, the pulse width comparator 107 outputs a reset signal rst1.

Here, the operation core PE calculates the pulse width set value based on a duty ratio, which is determined based on the feedback signal mon3 fed back from the PFC unit, and the cycle of the PFC control pulse signal pfc1. The term "cycle" herein described refers to an interval at which the zero current detection signal cd1 of the current I1 is generated. The pulse width set value is updated as needed by PFC control. For example, the pulse width set value is updated at the timing when the count value of the up-counter 101 is cleared.

The OR gate 108 receives the clear signals cd1a and cd1b output from the counter clear control circuit 202, and the clear signal clr output from the cycle upper limit comparator 104. The OR gate 108 outputs a set signal set1. The set signal set1 is a clear signal for clearing the count value of the up-counter 101.

The first control pulse output circuit 109 generates the PFC control pulse signal pfc1 based on the set signal set1 and the reset signal rst1, and outputs the generated signal. As described in detail later, the PFC control pulse signal pfc1 is set to the active level from the inactive level at the timing when the set signal set1 is input. On the other hand, the PFC control pulse signal pfc1 is reset to the inactive level from the active level at the timing when the reset signal rst1 is input. That is, the PFC control pulse signal pfc1 is at the active level during the period from the timing when the set signal set1 is input and the timing when the reset signal rst1 is input.

For example, as shown in FIGS. 2A and 2B and the like, when the PFC control pulse signal pfc1 is input to an NMOS transistor, the PFC control pulse signal pfc1 is at H (High) level during the period of the active level. On the other hand, when the PFC control pulse signal pfc1 is input to a PMOS transistor (not shown), the PFC control pulse signal pfc1 is at L (Low) level during the period of the active level.

The count value capture circuit 110 captures the count value cnt1 of the up-counter 101 at the timing when the zero current detection signal cd1 of the current I1 is input. Specifically, the count value cnt1 of the up-counter 101 at the time when the count value is cleared, i.e., a cycle value T of the "preceding cycle" (hereinafter, T represents a maximum count value of the "preceding cycle") is captured.

The shift circuit 111 shifts the cycle value T, which is captured by the count value capture circuit 110, by one bit, and generates a ½ cycle value T/2 as a target phase difference.

The phase comparator 112 is a digital comparator, and is, more specifically, a coincidence circuit. When the count value cnt1 of the up-counter 101 matches the ½ cycle value T/2 generated by the shift circuit 111, the phase comparator 112 outputs a coincidence signal cs1.

The output timing correction circuit 113 determines the timing when the zero current detection signal cd2 of the current I2 is input, based on the set signal set1 and the coincidence signal cs1 output from the phase comparator 112, and outputs a set signal set2 at an appropriate timing. The configuration and operation of the output timing correction circuit 113 will be described later.

The down-counter 116 starts counting down from the pulse width set value of the PFC control pulse signal pfc2 at the timing when the set signal set2 is input. The down-counter 116 counts down according to the clock signal clk, stops counting down when the count value reaches 1, and outputs a reset signal rst2. Note that when the count value reaches 1, instead of 0, the reset signal rst2 is output to thereby obtain a desired pulse width.

As in the case of the PFC control pulse signal pfc1, the operation core PE calculates the pulse width set value based on the duty ratio, which is determined based on the feedback signal mon3 fed back from the PFC unit, and the cycle of the PFC control pulse signal pfc1. In other words, the pulse width set values of the PFC control pulse signals pfc1 and pfc2 are generated from the same signal, and thus are substantially the same values. However, the pulse width set values need not necessarily be the same value. This pulse width set value is updated as needed by PFC control. For example, the pulse width set value is updated at the timing when the count value of the up-counter 101 is cleared, for example.

The second control pulse output circuit 117 generates the PFC control pulse signal pfc2 based on the set signal set2 and the reset signal rst2, and outputs the generated signal. As described in detail later, the PFC control pulse signal pfc2 is set to the active level from the inactive level at the timing when the set signal set2 is input. On the other hand, the PFC control pulse signal pfc2 is reset to the inactive level from the active level at the timing when the reset signal rst2 is input. That is, the PFC control pulse signal pfc2 is at the active level during the period from the timing when the set signal set2 is input to the timing when the reset signal rst2 is input.

The interrupt signal output circuit 118 generates and outputs an interrupt signal int every time the count value cnt1 of the up-counter 101 is cleared. For example, the operation core PE updates the pulse width set values of the PFC control pulse signals pfc1 and pfc2 every time the operation core PE receives the interrupt signal int.

Figure 7:
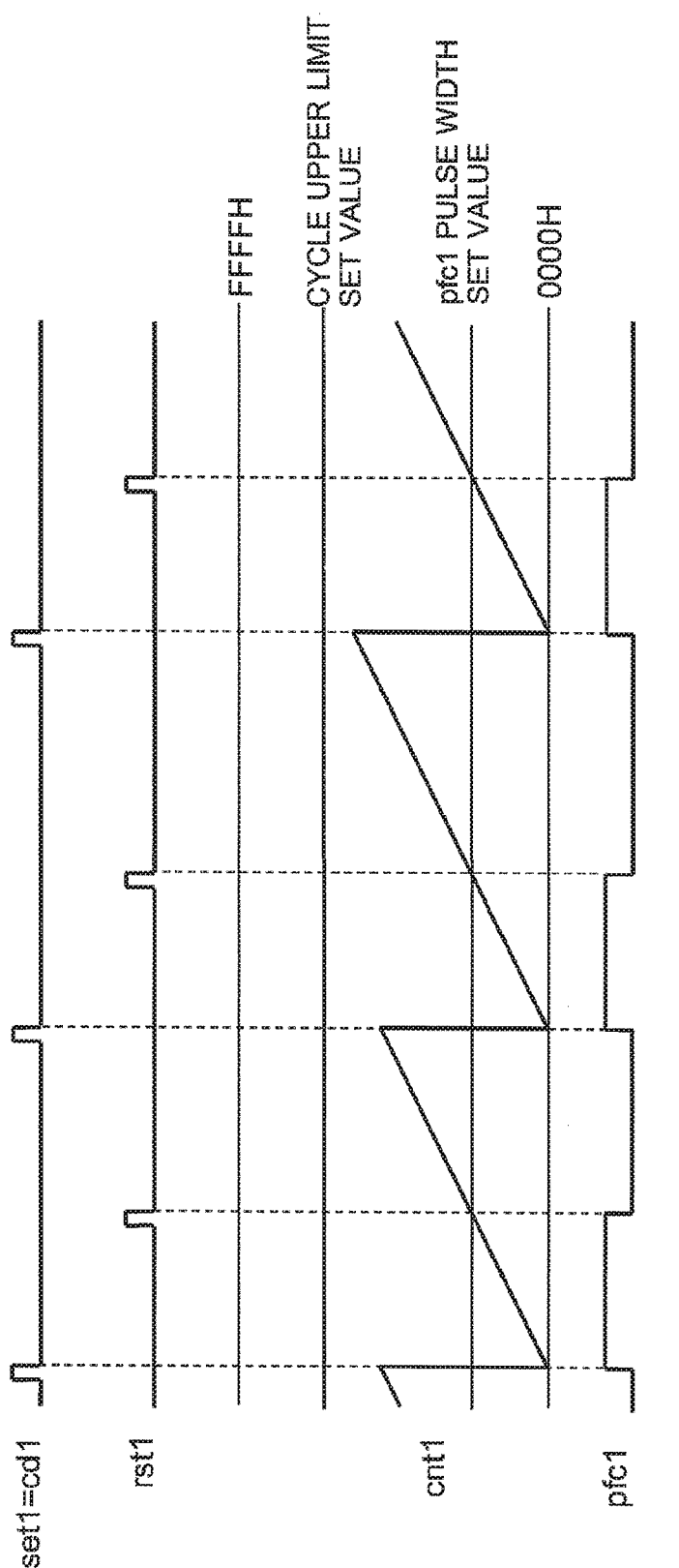
FIG. 7 is a timing diagram for explaining a method for generating a PFC control pulse signal pfc1.

Referring next to FIG. 7, a method for generating the PFC control pulse signal pfc1 will be described. FIG. 7 is a timing diagram for explaining the method for generating the PFC control pulse signal pfc1. FIG. 7 shows, sequentially from the top, the set signal set1, the reset signal rst1, the count value cnt1 of the up-counter 101, and the PFC control pulse signal pfc1.

As described above, the set signal set1 is basically the zero current detection signal cd1 of the current I1. Specifically, as shown in FIG. 7, at the timing when the zero current detection signal cd1 of the current I1 is generated, the count value cnt1 of the up-counter 101 is cleared and the PFC control pulse signal pfc1 is switched from the inactive level to the active level.

As shown in FIG. 7, the 16-bit up-counter 101 is capable of counting from 0000H to FFFFH. Accordingly, the pulse width set value of the PFC control pulse signal pfc1 and the cycle upper limit set value are values from 0000H to FFFFH. As a matter of course, the relation that the pulse width set value≤the cycle upper limit set value+1 holds. As described above, when the count value cnt1 of the up-counter 101 matches the pulse width set value, the reset signal rst1 is output from the pulse width comparator 107. At this timing, the PFC control pulse signal pfc1 is switched from the active level to the inactive level. Accordingly, the PFC control pulse signal pfc1 as shown in FIG. 7 is generated.

Figure 8:
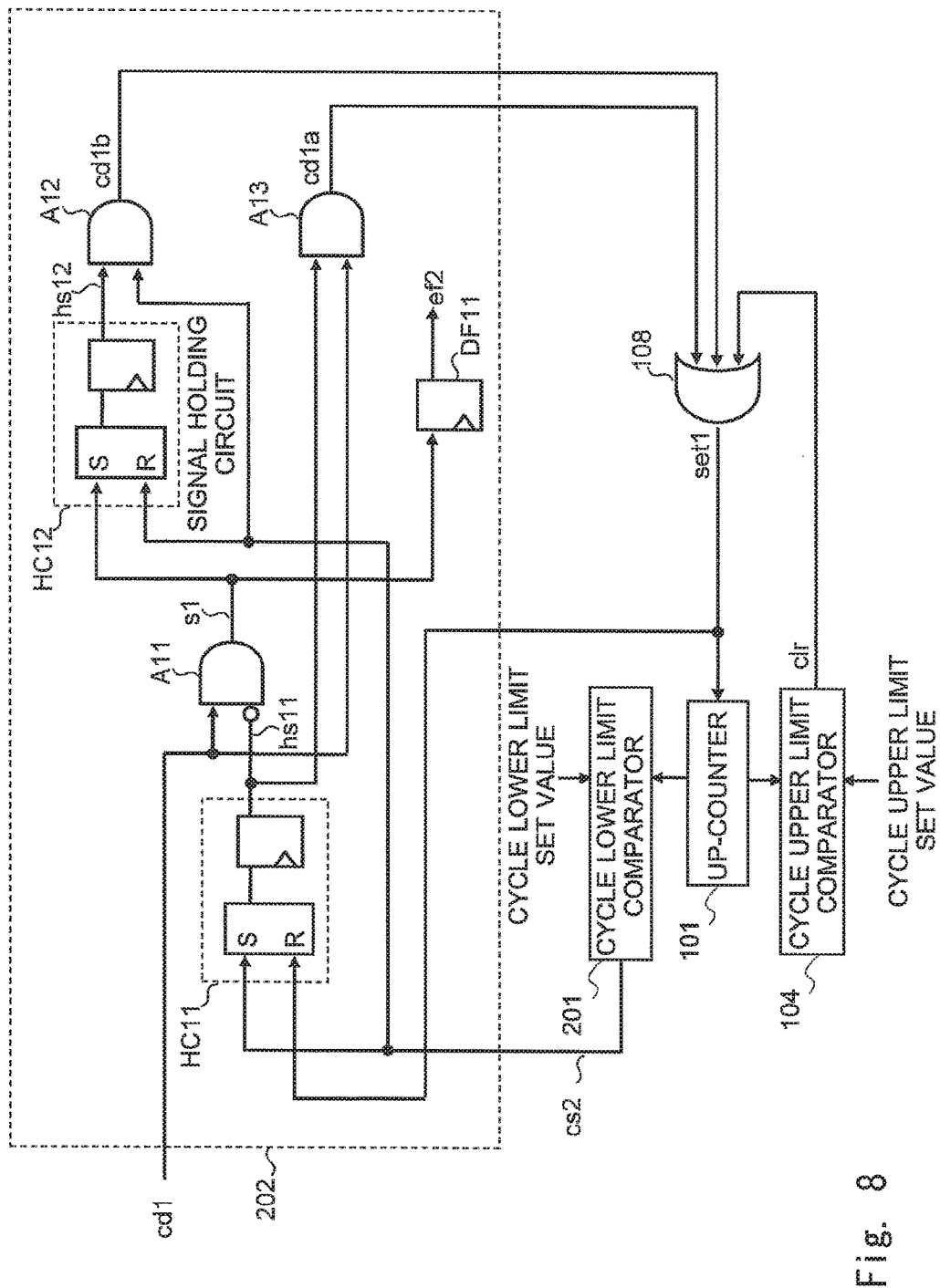
FIG. 8 is a circuit diagram showing an example of a specific circuit configuration of a counter clear control circuit 202.

Referring next to FIG. 8, a specific circuit configuration of the counter clear control circuit 202 will be described. The circuit configuration described below is by way of example only. FIG. 8 is a circuit diagram showing an example of a specific circuit configuration of the counter clear control circuit 202. As shown in FIG. 8, the counter clear control circuit 202 includes holding circuits HC11 and HC12, AND gates A11 to A13, and a D flip-flop DF11. Each of the holding circuits HC11 and HC12 is composed of a D flip-flop. In the preceding-stage, "S" and "R" respectively represent a set input and a reset input corresponding to a data input of each D flip-flop. The clock signal clk is input to a clock input of each D flip-flop.

The coincidence signal cs2 output from the cycle lower limit comparator 201 is input to the reset input S of the holding circuit HC11, and the set signal set1 is input to the reset input R. An output signal of the holding circuit HC1 is a period signal hs11 indicating a period exceeding the cycle lower limit set value. The inverted signal of the period signal hs11 is input to one input of the AND gate A11. The zero current detection signal cd1 of the current I1 is input to the other input of the AND gate A11.

An output signal of the AND gate A11 is a detection signal s1 to be generated when the zero current detection signal cd1 of the current I1 is input at a timing equal to or less than the cycle lower limit set value. This detection signal s1 is input to the set input S of the holding circuit HC12. The coincidence signal cs2 is input to the reset input R of the holding circuit HC12. An output signal of the holding circuit HC12 is a held signal hs12 to be held until the cycle lower limit set value is reached, when the zero current detection signal cd1 of the current I1 is input. This held signal hs12 is input to one input of the AND gate A12. The coincidence signal cs2 is input to the other input of the AND gate A12. An output signal of the AND gate A12 is the clear signal cd1b which constitutes one set signal set1.

The period signal hs11 output from the holding circuit HC11 is input to one input of the AND gate A13. The zero current detection signal cd1 of the current I1 is input to the other input of the AND gate A13. An output signal of the AND gate A13 is the clear signal cd1a which constitutes one set signal set1.

When the detection signal s1 is generated, the D flip-flop DF11 captures the detection signal s1 and outputs an error flag ef2.

Figure 9:
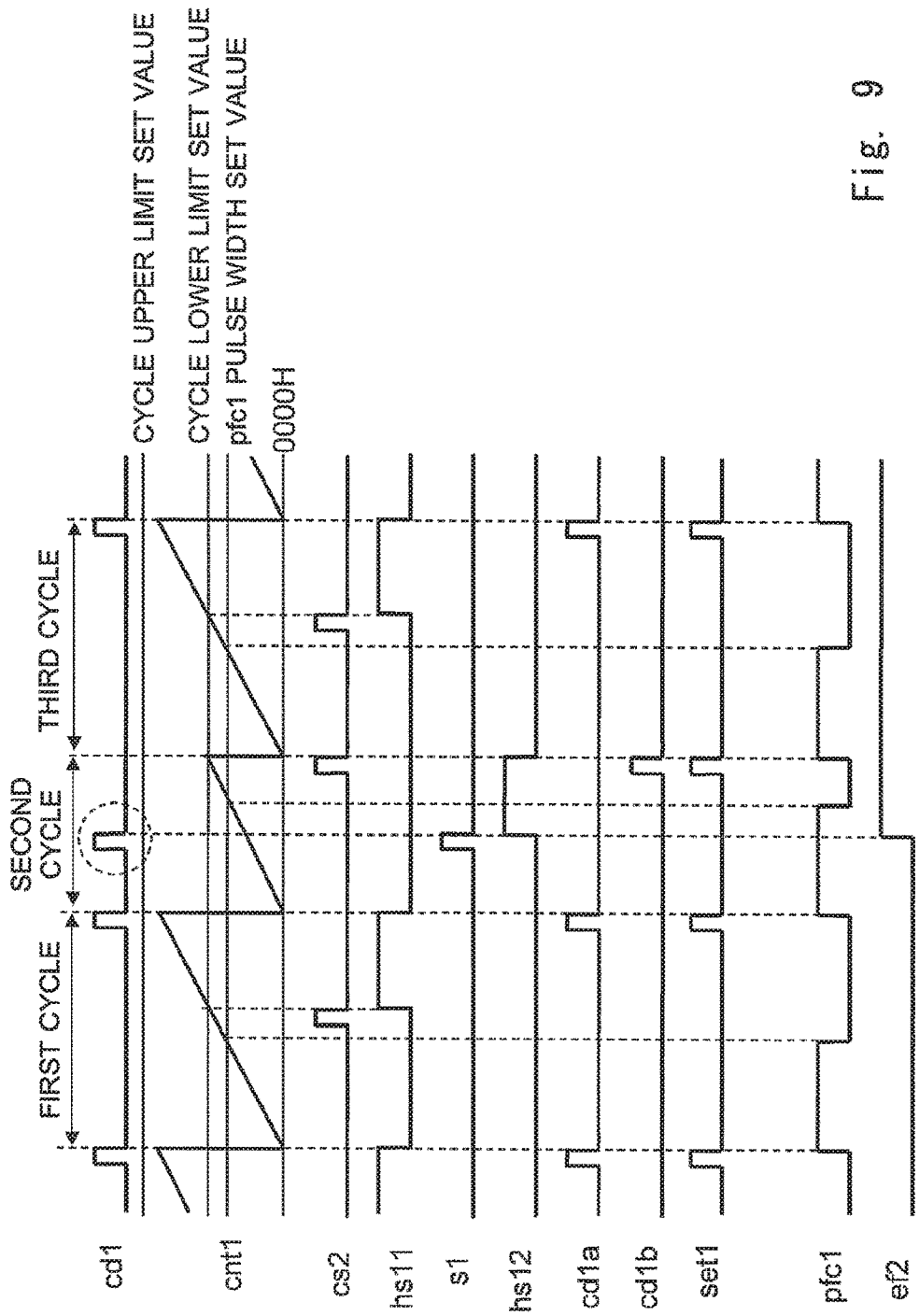
FIG. 9 is a timing diagram for explaining an operation of the counter clear control circuit 202.

Next, an operation of the counter clear control circuit 202 shown in FIG. 8 will be described with reference to the timing diagram of FIG. 9. FIG. 9 is a timing diagram for explaining an operation of the counter clear control circuit 202. FIG. 9 shows, sequentially from the top, the zero current detection signal cd1 of the current I1, the coincidence signal cs2, the period signal hs11, the set signal set1, the count value cnt1 of the up-counter 101, the coincidence signal cs2, the detection signal s1, the held signal hs12, the clear signal cd1a, the clear signal cd1b, the set signal set1, the PFC control pulse signal pfc1, and the error flag ef2.

In the first and third cycles shown in FIG. 9, the zero current detection signal cd1 of the current I1 is input at a timing after the cycle lower limit set value is reached. Accordingly, the clear signal cd1a is output at the timing, as usual.

On the other hand, in the second cycle shown in FIG. 9, the zero current detection signal cd1 of the current I1 is input at a timing equal to or less than the cycle lower limit set value. Accordingly, the zero current detection signal cd1 of the current I1 is input, while the period signal hs11 indicating a period exceeding the cycle lower limit set value is held at L. At the timing, the detection signal s1 is generated, and the held signal hs12 shifts from L to H and is held. Then, at the timing when the coincidence signal cs2 indicating the lapse of the cycle lower limit set value is input, the held signal hs12 shifts from H to L, and the clear signal cd1b is output. In this manner, the cycle lower limit set value is set and the cycle lower limit of the PFC control pulse signal pfc1 is ensured, thereby making it possible to generate the PFC control pulse signal that further improves the power factor correction by the PFC circuit.

Figure 10:
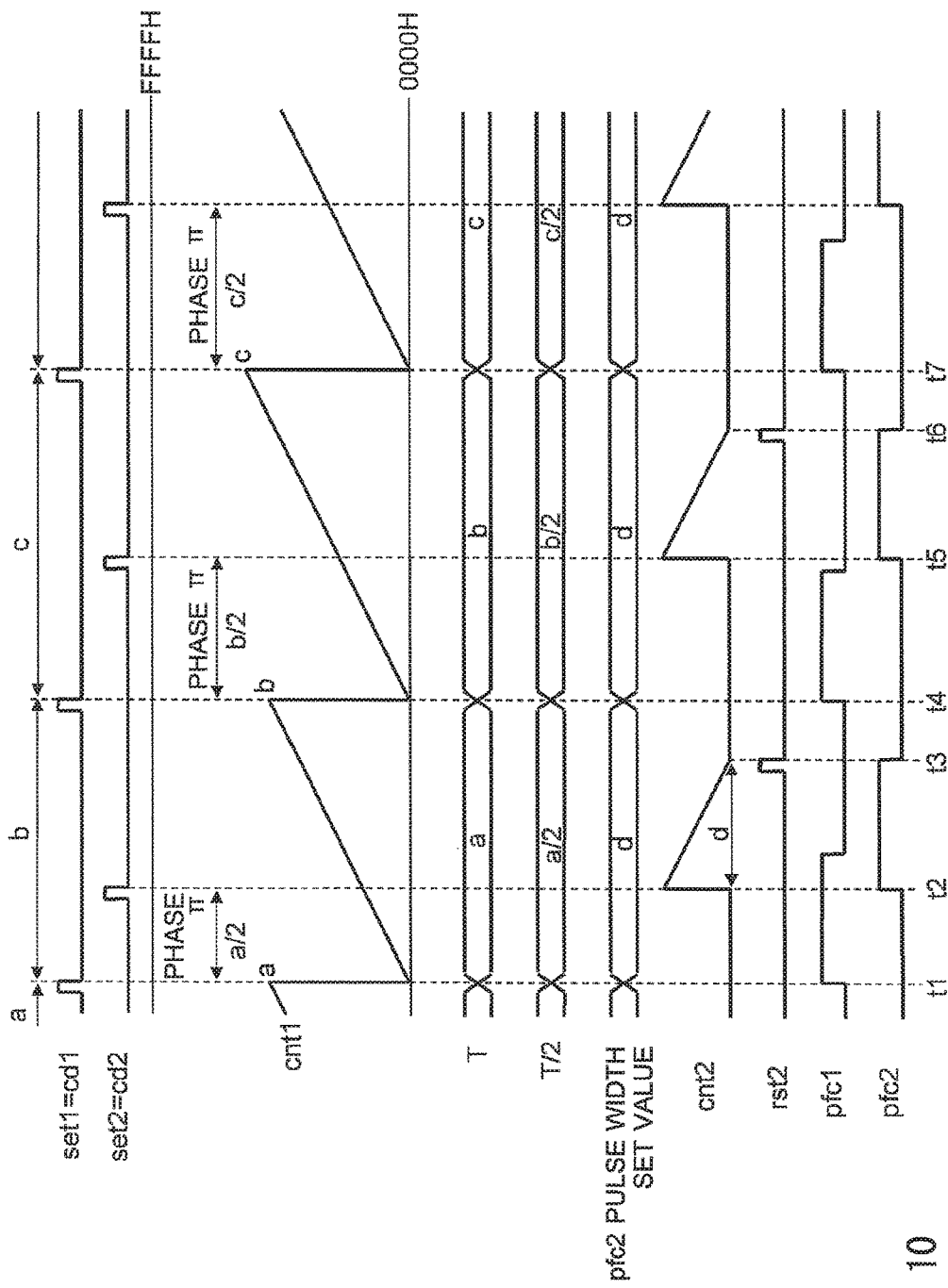
FIG. 10 is a timing diagram for explaining a method for generating a PFC control pulse signal pfc2.

Next, a method for generating the PFC control pulse signal pfc2 will be described with reference to FIG. 10. FIG. 10 is a timing diagram for explaining the method for generating the PFC control pulse signal pfc2. FIG. 10 shows, sequentially from the top, the set signal set1, the set signal set2, the count value cnt1 of the up-counter 101, the cycle value T acquired by the count value capture circuit 110, the ½ cycle value T/2 output from the shift circuit 111, the pulse width set value of the PFC control pulse signal pfc2, the count value cnt2 of the down-counter 116, the reset signal rst2, the PFC control pulse signal pfc1, and the PFC control pulse signal pfc2. Note that the description of the method for generating the PFC control pulse signal pfc1 will be omitted.

Referring to FIG. 10, in every cycle, the set signal set2 (the zero current detection signal cd2 of the current I2) is generated at a timing shifted by the ½ cycle value T/2 from the generation timing of the set signal set1 (the zero current detection signal cd1 of the current I1). This indicates an ideal state. As shown in FIG. 8, the 16-bit up-counter 101 is capable of counting from 0000H to FFFFH. Accordingly, the pulse width set value of the PFC control pulse signal pfc1 and the cycle upper limit set value are values from 0000H to FFFFH. As a matter of course, the relation that the pulse width set value the cycle upper limit set value+1 holds.

Referring to FIG. 10, the description is made in time series. As shown in the uppermost row, the zero current detection signal cd1 of the current I1, i.e., the set signal set1 is generated at time t1. This allows the count value cnt1 of the up-counter 101 to be cleared. In this case, the count value capture circuit 110 acquires, as the cycle value T of the preceding cycle, the count value cnt1 of the up-counter 101=a at the time when the count value is cleared. That is, the cycle value T=a. Then, the shift circuit 111 shifts this value by 1 bit. Specifically, the acquired cycle value T=a is halved to obtain the ½ cycle value T/2=a/2 corresponding to the phase difference π.

Next, the zero current detection signal cd2 of the current I2 is generated at time t2 when the ½ cycle value T/2=a/2 has elapsed from time t1. This is the ideal state as described above. In this case, the set signal set2 is generated simultaneously with the zero current detection signal cd2 of the current I2. Accordingly, at this timing, the PFC control pulse signal pfc2 is switched from the inactive level to the active level. At the same time, the down-counter 116 starts counting down from the pulse width set value of the PFC control pulse signal pfc2=d.

Next, at time t3 when the count value cnt2 of the down-counter 116=1 (0001H), the reset signal rst2 is generated. This allows the PFC control pulse signal pfc2 to be switched from the active level to the inactive level.

Next, at time t4, the zero current detection signal cd1 of the current I1, i.e., the set signal set1 is generated again. This allows the count value cnt1 of the up-counter 101 to be cleared. Thus, the cycle starting from time t1 ends. In this manner, the interval between the adjacent zero current detection signals cd1 of the current I1 corresponds to the cycle. The value of this cycle is represented by "b".

In the same manner as that at time t1, at time t4, the count value capture circuit 110 acquires, as the cycle value T of the preceding cycle, the count value cnt1 of the up-counter 101=b at the time when the count value is cleared. That is, the cycle value T=b. Then, the shift circuit shifts this value by 1 bit. Specifically, the acquired cycle value T=b is halved to obtain the ½ cycle value T/2=b/2 corresponding to the phase difference π.

Next, at time t5 when the ½ cycle value T/2=b/2 has elapsed from time t4, the zero current detection signal cd2 of the current I2 is generated. This is the ideal state as described above. In this case, the set signal set2 is generated simultaneously with the zero current detection signal cd2 of the current I2. Accordingly, at this timing, the PFC control pulse signal pfc2 is switched from the inactive level to the active level. At the same time, the down-counter 116 starts counting down from the pulse width set value of the PFC control pulse signal pfc2=d.

Next, at time t6 when the count value cnt2 of the down-counter 116=1(0001H), the reset signal rst2 is generated. This allows the PFC control pulse signal pfc2 to be switched from the active level to the inactive level.

Next, at time t7, the zero current detection signal cd1 of the current I1, i.e., the set signal set1 is generated again. This allows the count value cnt1 of the up-counter 101 to be cleared. Thus, the cycle starting from time t4 ends. The value of this cycle is represented by "c". As described above, the PFC control pulse signal pfc2 as shown in FIG. 10 is generated.

The ideal state has been described above with reference to FIG. 10. However, the zero current detection signal cd2 of the current I2 is not necessarily generated at the timing shifted by the ½ cycle value T/2 from the generation timing of the zero current detection signal cd1 of the current I1. In order to balance the high efficiency due to the detection of the zero current of the current I2 and the high efficiency achieved by setting the phase difference π between the PFC control pulse signals pfc1 and pfc2, the PFC signal generation unit PSG according to this embodiment is provided with the output timing correction circuit 113. This output timing correction circuit 113 corrects the output timing of the set signal set2 according to the generation timing of the zero current detection signal cd2 of the current I2 with respect to the generation timing of the zero current detection signal cd1 of the current I1. The output of the set signal set2 allows the PFC control pulse signal pfc2 to be switched from the inactive level to the active level.

Figure 11:
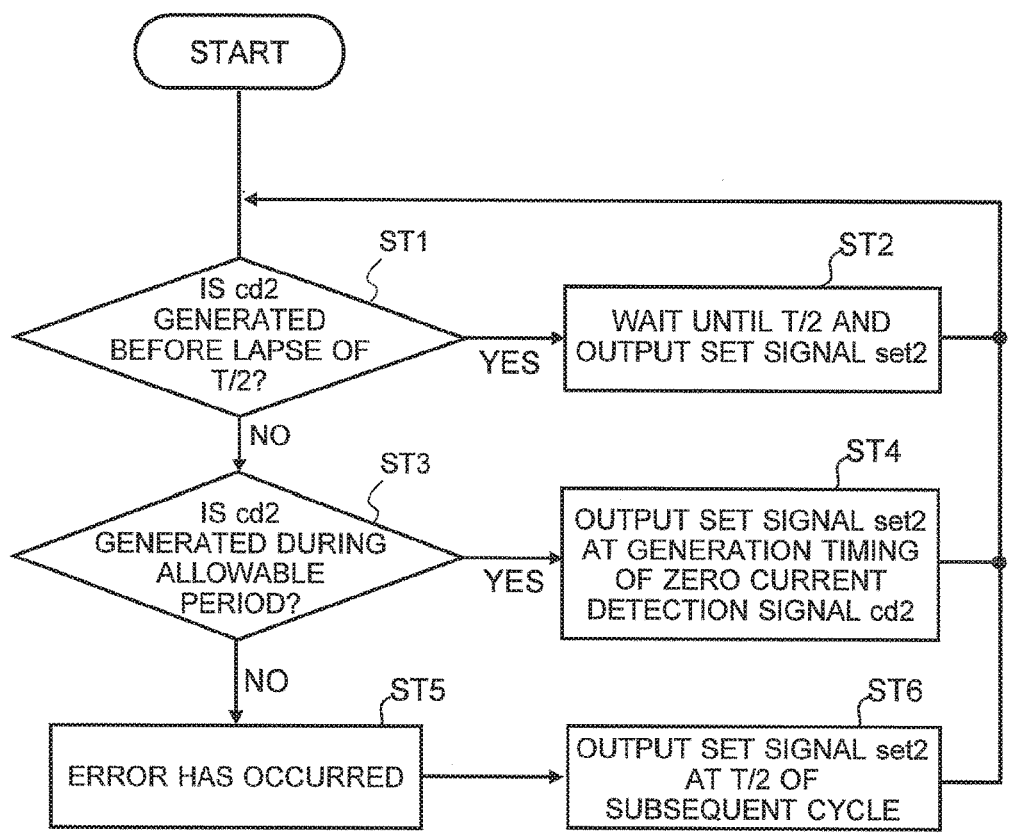
FIG. 11 is a flowchart showing a processing flow of an output timing correction circuit 113.

Referring now to FIG. 11, a specific processing flow of the output timing correction circuit 113 will be described. FIG. 11 is a flowchart showing a processing flow of the output timing correction circuit 113.

First, the output timing correction circuit 113 determines, in each cycle, whether the zero current detection signal cd2 of the current I2 is generated or not before the lapse of the time of the ½ cycle value T/2 (T represents the cycle value of the preceding cycle) from the start (step ST1). When the zero current detection signal cd2 of the current I2 is generated during the period from the start to the lapse of the ½ cycle value T/2 (YES in step ST1), the output timing correction circuit 113 waits until the ½ cycle value T/2 is reached, and outputs the set signal set2 (step ST2). In this case, needless to say, T/2 is most preferable as the target phase difference, but the target phase difference may be ⅜T to ⅝T. A target phase difference of ⁷⁄₁₆T to ⁹⁄₁₆T is more preferable in terms of improvement in efficiency.

Next, when the zero current detection signal cd2 of the current I2 is not generated during the period from the start to the lapse of the time of the ½ cycle value T/2 (NO in step ST1), it is determined whether the zero current detection signal cd2 of the current I2 is generated within a predetermined allowable period from the ½ cycle value T/2 (step ST3). When the zero current detection signal cd2 of the current I2 is generated within the allowable period (YES in step ST3), the output timing correction circuit 113 outputs the set signal set2 at the timing when the zero current detection signal cd2 of the current I2 is generated (step ST4). This allows the PFC control pulse signal pfc2 to be switched from the inactive level to the active level. The allowable period is preferably in the range from T/64 to T/8. When the allowable period is in the range of less than T/64, errors occur more frequently, which is unfavorable in terms of system operation. On the other hand, the allowable period in the range of more than T/8 does not contribute to the power factor correction in the PFC circuit.

Next, when the zero current detection signal cd2 of the current I2 is not generated within the allowable period (NO in step ST3), the output timing correction circuit 113 determines that an error has occurred (step ST5). Then, the output timing correction circuit 113 forcibly outputs the set signal set2 at the timing when the time of the ½ cycle value T/2 has elapsed from the start of the subsequent cycle, without outputting the set signal set2 in the cycle (step ST6). The above-described process is repeatedly executed in each cycle.

Figure 12:
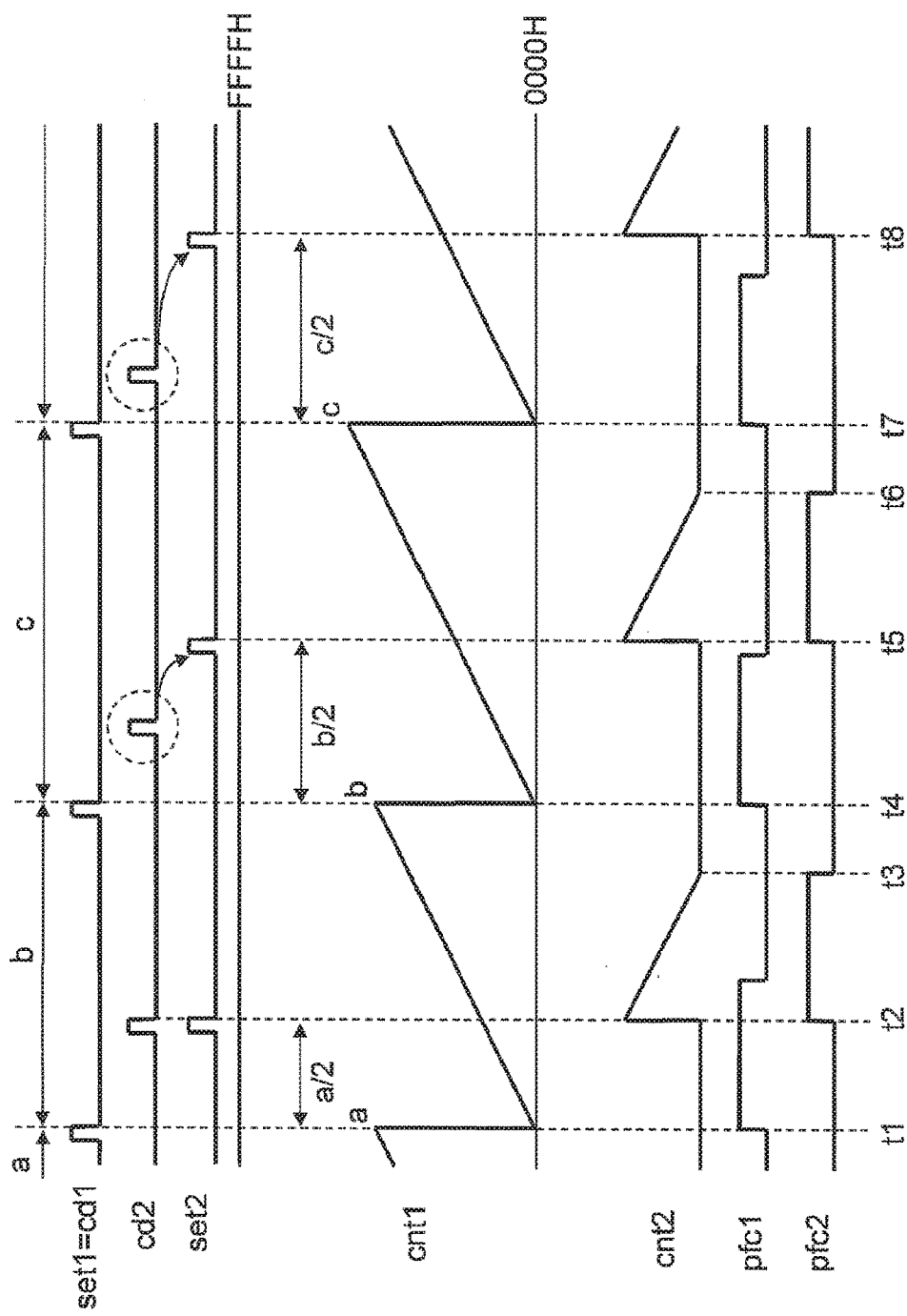
FIG. 12 is a timing diagram for explaining a method for generating the PFC control pulse signal pfc2.

Next, each process shown in FIG. 11 will be described with reference to the timing diagrams of FIGS. 12 to 14. As with FIG. 8, FIGS. 10 to 12 are timing diagrams for explaining the method for generating the PFC control pulse signal pfc2. Each of FIGS. 10 to 12 shows, sequentially from the top, the set signal set1, the zero current detection signal cd2 of the current I2, the set signal set2, the count value cnt1 of the up-counter 101, the count value cnt2 of the down-counter 116, the reset signal rst2, the PFC control pulse signal pfc1, and the PFC control pulse signal pfc2. FIG. 14 also shows an error flag ef1 in the lowermost row.

First, FIG. 12 will be described. The initial cycle starting from time t1 is in the ideal state. On the other hand, in the two subsequent cycles, the zero current detection signal cd2 of the current I2 is generated during the period from the start to the ½ cycle value T/2.

Referring to FIG. 12, the description is made in time series. The period from time t1 to time t4 is in the ideal state as in FIG. 10, so the description thereof is omitted. First, when the second zero current detection signal cd1 of the second current I1, i.e., the set signal set1 is generated at time t4, the count value cnt1 of the up-counter 101 is cleared. In the cycle starting from time t4, the cycle value T of the preceding cycle=b.

Next, the zero current detection signal cd2 of the current I2 is generated during the period from time t4 to time t5 when the ½ cycle value T/2=b/2 has elapsed. In this case, as described above, the output timing correction circuit 113 waits until time t5 and outputs the set signal set2, without outputting the set signal set2 at the generation timing of the zero current detection signal cd2. At this timing, the PFC control pulse signal pfc2 is switched from the inactive level to the active level. At the same time, the down-counter 116 starts counting down from the pulse width set value of the PFC control pulse signal pfc2.

Next, at time t6 when the count value cnt2 of the down-counter 116=1(0001H), the reset signal rst2 is generated. This allows the PFC control pulse signal pfc2 to be switched from the active level to the inactive level.

Next, at time t7, the zero current detection signal cd1 of the current I1, i.e., the set signal set1 is generated again. This allows the count value cnt1 of the up-counter 101 to be cleared. Thus, the cycle starting from time t4 ends. In the cycle starting from time t7, the cycle value T of the preceding cycle=c.

Also in the cycle starting from time t7, the zero current detection signal cd2 of the current I2 is generated during the period from time t7 to time t8 when the ½ cycle value T/2=c/2 has elapsed. Accordingly, in the manner as described above, the output timing correction circuit 113 waits until time t8 and outputs the set signal set2, without outputting the set signal set2 at the generation timing of the zero current detection signal cd2.

Next, FIG. 13 will be described. The initial cycle starting from time t1 is in the ideal state. On the other hand, in the two subsequent cycles, the zero current detection signal cd2 of the current I2 is generated during an allowable period TR from the ½ cycle value T/2.

Figure 13:
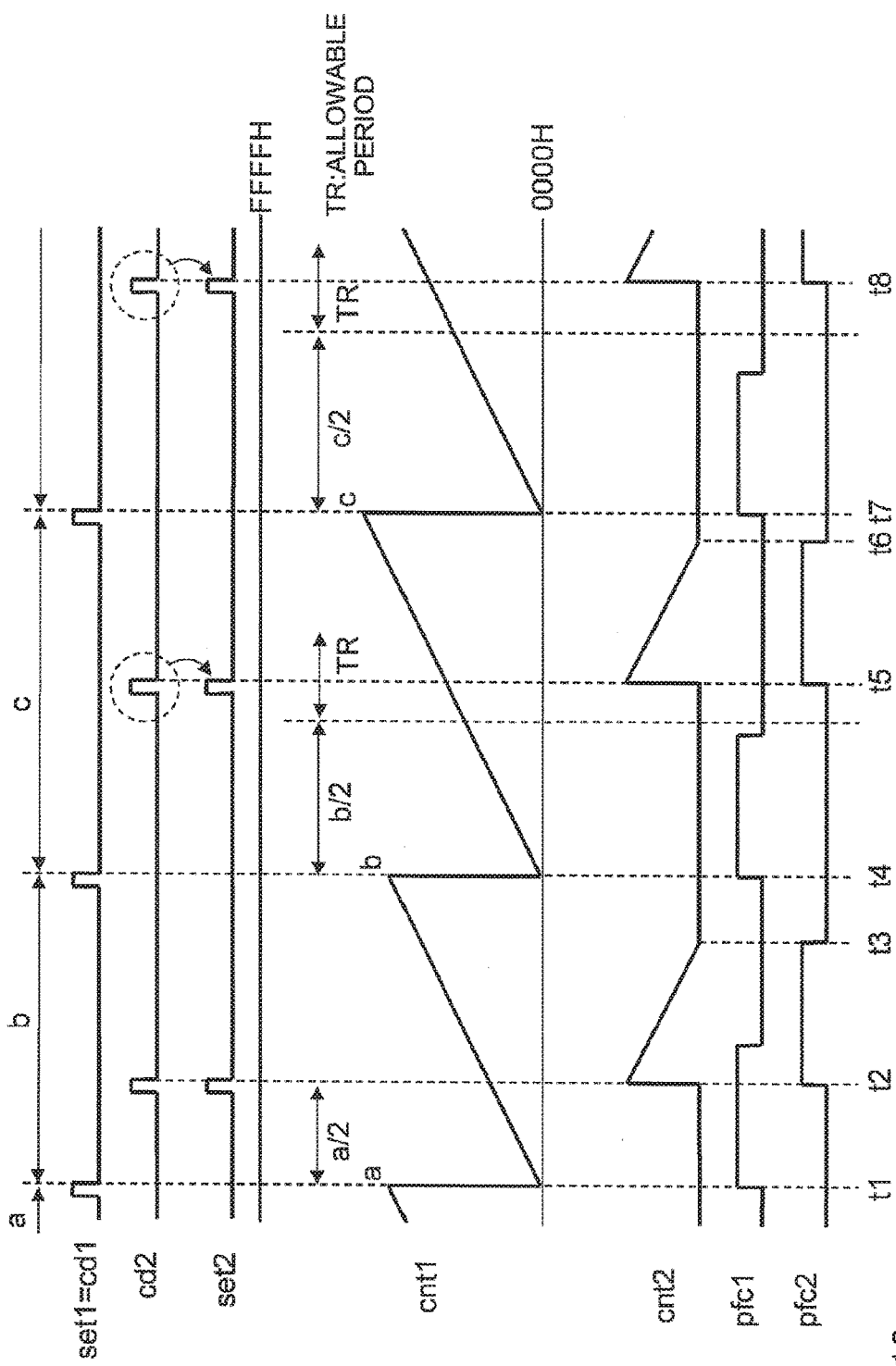
FIG. 13 is a timing diagram for explaining a method for generating the PFC control pulse signal pfc2.
Figure 14:
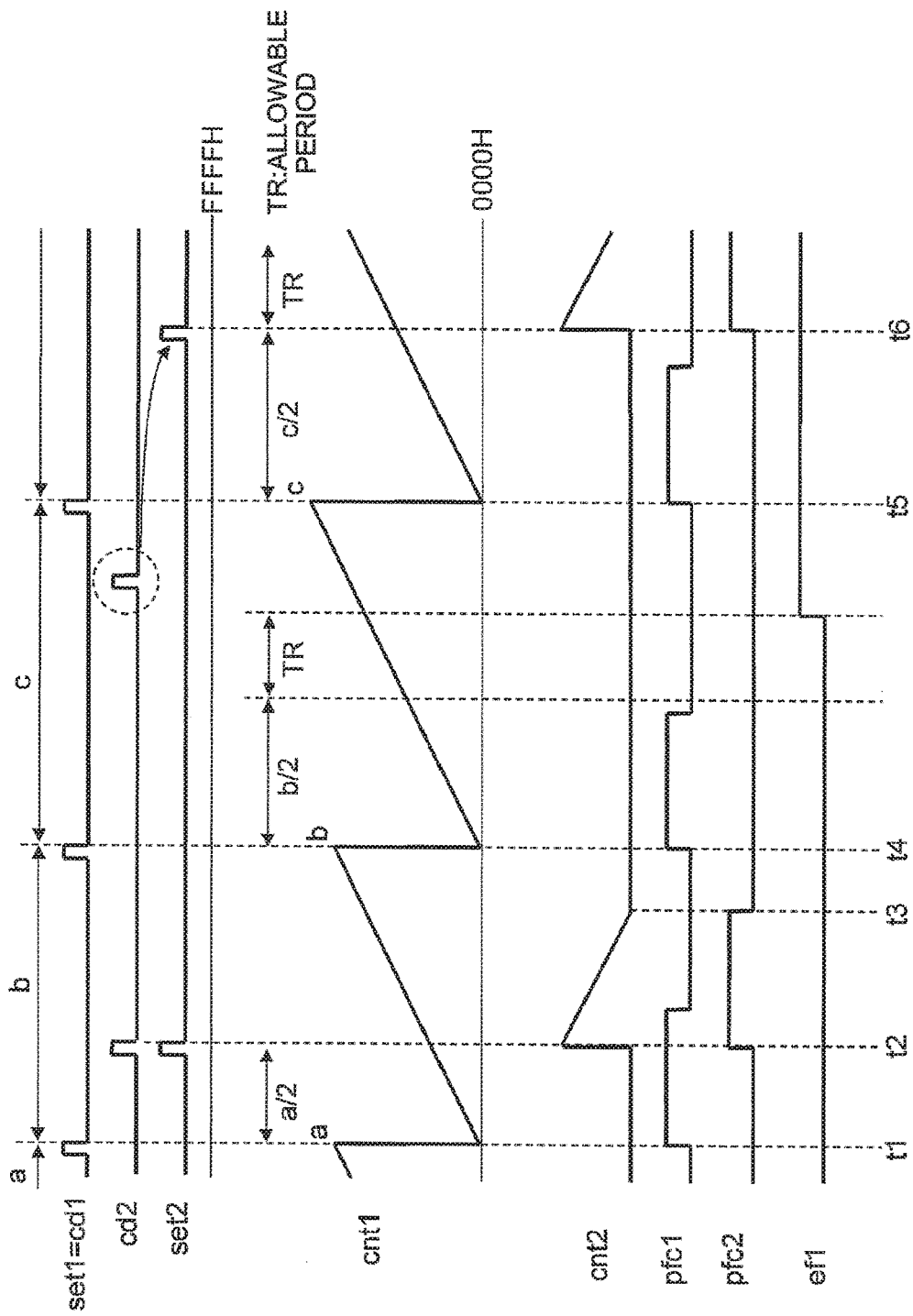
FIG. 14 is a timing diagram for explaining a method for generating the PFC control pulse signal pfc2.

Referring to FIG. 13, the description is made in time series. The period from time t1 to time t4 is in the ideal state as in FIG. 10, so the description thereof is omitted. First, at time t4, when the second zero current detection signal cd1 of the current I1, i.e., the set signal set1 is generated, the count value cnt1 of the up-counter 101 is cleared. In the cycle starting from time t4, the cycle value T of the preceding cycle=b.

Next, at time t5 within the allowable period TR from the ½ cycle value T/2=b/2, the zero current detection signal cd2 of the current I2 is generated. In this case, as described above, the output timing correction circuit 113 outputs the set signal et2 at time t5 when the zero current detection signal cd2 is generated. At this timing, the PFC control pulse signal pfc2 is switched from the inactive level to the active level. At the same time, the down-counter 116 starts counting down from the pulse width set value of the PFC control pulse signal pfc2.

Next, at time t6 when the count value cnt2 of the down-counter 116=1 (0001H), the reset signal rst2 is generated. This allows the PFC control pulse signal pfc2 to be switched from the active level to the inactive level.

Next, at time t7, the zero current detection signal cd1 of the current I1, i.e., the set signal set1 is generated again. This allows the count value cnt1 of the up-counter 101 to be cleared. Thus, the cycle starting from time t4 ends. In the cycle starting from time t7, the cycle value T of the preceding cycle=c.

Also in the cycle starting from time t7, the zero current detection signal cd2 of the current I2 is generated at time t8 within the allowable period TR from the ½ cycle value T/2=c/2. Accordingly, in the same manner as described above, the output timing correction circuit 113 outputs the set signal set2 at time t8 when the zero current detection signal cd2 is generated.

Next, FIG. 14 will be described. The initial cycle starting from time t1 is in the ideal state. On the other hand, in the subsequent cycle, the zero current detection signal cd2 of the current I2 is generated at a timing after the allowable period TR from time T/2.

Referring to FIG. 14, the description is made in time series. The period from time t1 to time t4 is in the ideal state as in FIG. 10, so the description thereof is omitted. First, at time t4, when the second zero current detection signal cd1 of the current I1, i.e., the set signal set1 is generated, the count value cnt1 of the up-counter 101 is cleared. In the cycle starting from time t4, the cycle value T of the preceding cycle=b.

Here, the zero current detection signal cd2 of the current I2 is generated at a timing after the allowable period TR from the ½ cycle value T/2=b/2. In this case, as described above, the output timing correction circuit 113 forcibly outputs the set signal set2 at the ½ cycle value T/2 from the start of the subsequent cycle, without outputting the set signal set2 in the cycle. At a timing after the allowable period TR, the error flag ef1 is switched from L to H.

Next, at time t5, the zero current detection signal cd1 of the current I1, i.e., the set signal set1 is generated again. This allows the count value cnt1 of the up-counter 101 to be cleared. Thus, the cycle starting from time t4 ends. In the cycle starting from time t5, the cycle value T of the preceding cycle=c. Then, as described above, at the ½ cycle value T/2=c/2 (time t6) of the cycle starting from time t5, the output timing correction circuit 113 forcibly outputs the set signal set2.

The PFC signal generation unit SG according to this embodiment sets the cycle lower limit set value to ensure the cycle lower limit of the PFC control pulse signal pfc1, thereby making it possible to generate the PFC control pulse signal that further improves the power factor correction by the PFC circuit. Further, the output timing correction circuit 113 determines the timing when the zero current detection signal cd2 of the current I2 is input, based on the set signal set1 for setting the PFC control pulse signal pfc1 to the active level, and on the coincidence signal cs1 output from the phase comparator 112, and outputs the set signal set2 for setting the PFC control pulse signal pfc2 to the active level at an appropriate timing. This makes it possible to balance the high efficiency due to the detection of the zero current of the current I2 and the high efficiency achieved by setting the phase difference between the PFC control pulse signals pfc1 and pfc2 to be approximately equal to n, leading to a further improvement in the power factor correction by the PFC circuit.

While the present invention has been described above with reference to embodiments, the present invention is not limited by the above embodiments. The configuration and details of the prevent invention can be modified in various manners which can be understood by those skilled in the art within the scope of the invention.

This application is based upon and claims the benefit of priority from Japanese patent application No. 2011-098790 filed on Apr. 26, 2011, the disclosure of which is incorporated herein in its entirety by reference.

REFERENCE SIGNS LIST

101 UP-COUNTER
104 CYCLE UPPER LIMIT COMPARATOR

107 PULSE WIDTH COMPARATOR
108 OR GATE
109 FIRST CONTROL PULSE OUTPUT CIRCUIT
110 COUNT VALUE CAPTURE CIRCUIT
111 SHIFT CIRCUIT
112 PHASE COMPARATOR
113 OUTPUT TIMING CORRECT ION CIRCUIT
116 DOWN-COUNTER
117 SECOND CONTROL PULSE OUTPUT CIRCUIT
118 INTERRUPT SIGNAL OUTPUT CIRCUIT
201 CYCLE LOWER LIMIT COMPARATOR
202 COUNTER CLEAR CONTROL CIRCUIT
A11-A13 AND GATE
Ap AC POWER SUPPLY
C1, C2 SMOOTHING CAPACITOR
cd1, cd2 ZERO CURRENT DETECT ION SIGNAL
clr, cd1a, cd1b CLEAR SIGNAL
CG CLOCK GENERATION UNIT
clk CLOCK SIGNAL
cnt1, cnt2 COUNT VALUE
cs1, cs2 COINCIDENCE SIGNAL
D1-D3 DIODE
DF11 D FLIP-FLOP
ef1, ef2 ERROR FLAG
FWR FULL-WAVE RECTIFICATION CIRCUIT
HC11, HC12 HOLDING CIRCUIT
hs11 PERIOD SIGNAL
hs12 HOLDING SIGNAL
int INTERRUPT SIGNAL
IOU UNIT
L1, L11, L12, L2, L21, L22, L3 INDUCTOR
LED LED
Lm1, Lm2 MONITOR INDUCTOR
MCU PROCESSOR SYSTEM
MEM MEMORY
MON MONITOR UNIT
mon, mon1-mon4 FEEDBACK SIGNAL
NM1-NM3 NMOS TRANSISTOR
O1, O2 OR GATE
PE OPERATION CORE
PERI PERIPHERAL CIRCUIT
pfc, pfc1, pfc2 PFC CONTROL PULSE SIGNAL
PSG PFC SIGNAL GENERATION UNIT
PWM PWM SIGNAL GENERATION UNIT
pwm PWM CONTROL PULSE SIGNAL
PWR POWER SUPPLY CIRCUIT (CONTROL TARGET CIRCUIT)
R, R1, R2, Rm, Rm1, Rm2 RESISTOR

The invention claimed is:

1. A PFC signal generation circuit that generates a PFC signal to control a PFC circuit including a first inductor connected to a first switch and a second inductor connected to a second switch, the PFC signal generation circuit comprising:
a counter whose count value is cleared based on a first timing at which a zero current of the first inductor is detected;
a first control signal output unit that outputs a first PFC signal to turn on the first switch at a timing when the count value is cleared;
a second control signal output unit that outputs a second PFC signal to turn on the second switch, based on a second timing at which a zero current of the second inductor is detected; and
an output timing correction circuit that corrects a timing for the second control signal output unit to output the second PFC signal according to a length of a period between the first timing and the second timing; and
a counter clear control circuit that clears the count value after waiting until a cycle lower limit is reached, when the first timing is below the cycle lower limit based on a comparison between the count value of the counter and a set value of the cycle lower limit.

2. The PFC signal generation circuit according to claim 1, wherein the output timing correction circuit periodically detects the length of the period between the first timing and the second timing and corrects the timing to output the second PFC signal according to a result of a comparison between the length of the period that is detected and a length of a previous period.

3. The PFC signal generation circuit according to claim 1, further comprising a second digital comparator that compares the count value of the counter with a set value of a pulse width of the first PFC signal determined based on a feedback signal from the PFC circuit.

4. The PFC signal generation circuit according to claim 1, further comprising a down-counter that counts down a set value of a pulse width of the second PFC signal determined based on a feedback signal from the PFC circuit.

5. A PFC signal generation circuit that generates a PFC signal to control a PFC circuit including a first inductor connected to a first switch and a second inductor connected to a second switch, the PFC signal generation circuit comprising:
a counter whose count value is cleared based on a first timing at which a zero current of the first inductor is detected;
a first control signal output unit that outputs a first PFC signal to turn on the first switch at a timing when the count value is cleared;
a second control signal output unit that outputs a second PFC signal to turn on the second switch, based on a second timing at which a zero current of the second inductor is detected; and
an output timing correction circuit that corrects a timing for the second control signal output unit to output the second PFC signal according to a length of a period between the first timing and the second timing;
a counter clear control circuit that clears the count value after waiting until a cycle lower limit is reached, when the first timing is below the cycle lower limit; and
a first digital comparator that compares the count value of the counter with a set value of the cycle lower limit,
wherein the counter clear control circuit determines whether the first timing is below the cycle lower limit, based on a comparison result of the first digital comparator.

6. The PFC signal generation circuit according to claim 5, wherein the output timing correction circuit periodically detects the length of the period between the first timing and the second timing and corrects the timing to output the second PFC signal according to a result of a comparison between the length of the period that is detected and a length of a previous period.

7. The PFC signal generation circuit according to claim 5, further comprising a second digital comparator that compares the count value of the counter with a set value of a pulse width of the first PFC signal determined based on a feedback signal from the PFC circuit.

8. The PFC signal generation circuit according to claim 5, further comprising a down-counter that counts down a set value of a pulse width of the second PFC signal determined based on a feedback signal from the PFC circuit.

* * * * *